(12) United States Patent
Manabe et al.

(10) Patent No.: US 9,605,204 B2
(45) Date of Patent: *Mar. 28, 2017

(54) LIQUID CRYSTAL MEDIUM AND HIGH FREQUENCY COMPONENTS COMPRISING SAME

(71) Applicant: MERCK PATENT GMBH, Darmstadt (DE)

(72) Inventors: Atsutaka Manabe, Bensheim (DE); Christian Jasper, Seligenstadt (DE); Volker Reiffenrath, Rossdorf (DE); Constanze Brocke, Gross-Gerau (DE); Detlef Pauluth, Ober-Ramstadt (DE); Dagmar Klass, Darmstadt (DE)

(73) Assignee: MERCK PATENT GMBH, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/367,254

(22) PCT Filed: Dec. 10, 2012

(86) PCT No.: PCT/EP2012/005095
§ 371 (c)(1),
(2) Date: Jun. 20, 2014

(87) PCT Pub. No.: WO2013/091789
PCT Pub. Date: Jun. 27, 2013

(65) Prior Publication Data
US 2015/0014584 A1    Jan. 15, 2015

(30) Foreign Application Priority Data

Dec. 21, 2011 (EP) .................. 11010133

(51) Int. Cl.
*C09K 19/44* (2006.01)
*C09K 19/18* (2006.01)

(52) U.S. Cl.
CPC ........ *C09K 19/18* (2013.01); *C09K 2019/181* (2013.01); *C09K 2019/183* (2013.01); *C09K 2019/188* (2013.01); *C09K 2219/11* (2013.01)

(58) Field of Classification Search
CPC .................. C09K 2219/11; C09K 2019/183
See application file for complete search history.

(56) References Cited

U.S. PATENT DOCUMENTS

| | | | |
|---|---|---|---|
| 7,361,288 B2 | 4/2008 | Lussem et al. | |
| 8,557,142 B2 | 10/2013 | Montenegro et al. | |
| 2005/0067605 A1 | 3/2005 | Lussem et al. | |
| 2012/0119141 A1* | 5/2012 | Manabe et al. | 252/299.01 |
| 2012/0182200 A1* | 7/2012 | Manabe et al. | 343/893 |
| 2012/0205583 A1* | 8/2012 | Montenegro | C09K 19/3001 252/299.63 |
| 2012/0261615 A1 | 10/2012 | Manabe et al. | |
| 2014/0239227 A1* | 8/2014 | Manabe | C09K 19/18 252/299.63 |

FOREIGN PATENT DOCUMENTS

| | | | | |
|---|---|---|---|---|
| CN | 103842474 A | * | 6/2014 | ............ C09K 19/18 |
| DE | 102004029429 A1 | | 2/2005 | |
| DE | 102010035987 A1 | | 3/2011 | |
| DE | WO 2011035849 A1 | * | 3/2011 | ............ C09K 19/18 |
| DE | 102010051508 A1 | | 6/2011 | |
| WO | 2011009524 A1 | | 1/2011 | |
| WO | WO 2011009524 A1 | * | 1/2011 | |
| WO | 2011035849 A1 | | 3/2011 | |
| WO | 2011035863 A1 | | 3/2011 | |
| WO | WO 2011035863 A1 | * | 3/2011 | |
| WO | 2011066905 A1 | | 6/2011 | |

OTHER PUBLICATIONS

"Liquid Crystal Systems for Microwave Applications." Dissertation by Artsiom Lapanik, 2009.*
International Search Report PCT/EP2012/005095 dated Feb. 15, 2013.
"Liquid crystal based microwave components with fast response times: material, technology, power handling capability," Dissertation by Felix Goelden, 2010.
"Liquid crystal systems for microwave applications," Dissertation by Artsiom Lapanik, 2009.
Office Action for related Chinese Patent Application No. 201280063201.5 dated May 6, 2015.

* cited by examiner

*Primary Examiner* — Chanceity Robinson
(74) *Attorney, Agent, or Firm* — Millen, White, Zelano and Branigan, P.C.

(57) ABSTRACT

The present invention relates to liquid crystal media and to high frequency components comprising same, especially microwave components for high-frequency devices, such as devices for shifting the phase of microwaves.

13 Claims, No Drawings

LIQUID CRYSTAL MEDIUM AND HIGH FREQUENCY COMPONENTS COMPRISING SAME

The present invention relates to liquid crystal media and to high frequency components comprising same, especially microwave components for high-frequency devices, such as devices for shifting the phase of microwaves, in particular for microwave phased-array antennas.

Liquid crystal media have been used for some time in electro-optical displays (liquid crystal displays—LCDs) in order to display information.

Recently, however, liquid crystal media have also been proposed for use in components for microwave technology, such as, for example, in WO 2011/009524 A8, DE 10 2004 029 429 A and in JP 2005-120208 (A).

As a typical microwave application, the concept of the inverted microstrip line as described by K. C. Gupta, R. Garg, I. Bahl and P. Bhartia: Microstrip Lines and Slotlines, 2$^{nd}$ ed., Artech House, Boston, 1996, is employed, for example, in D. Dolfi, M. Labeyrie, P. Joffre and J. P. Huignard: Liquid Crystal Microwave Phase Shifter. *Electronics Letters*, Vol. 29, No. 10, pp. 926-928, May 1993, N. Martin, N. Tentillier, P. Laurent, B. Splingart, F. Huert, P H. Gelin, C. Legrand: Electrically Microwave Tunable Components Using Liquid Crystals. 32$^{nd}$ European Microwave Conference, pp. 393-396, Milan 2002, or in Weil, C.: Passiv steuerbare Mikrowellenphasenschieber auf der Basis nichtlinearer Dielektrika [Passively Controllable Microwave Phase Shifters based on Nonlinear Dielectrics], Darmstädter Dissertationen D17, 2002, C. Weil, G. Lüssem, and R. Jakoby: Tunable Invert-Microstrip Phase Shifter Device Using Nematic Liquid Crystals, *IEEE MTT-S Int. Microw. Symp.*, Seattle, Wash., June 2002, pp. 367-370, together with the commercial liquid crystal K15 from Merck KGaA. C. Weil, G. Lüssem, and R. Jakoby: Tunable Invert-Microstrip Phase Shifter Device Using Nematic Liquid Crystals, *IEEE MTT-S Int. Microw. Symp.*, Seattle, Wash., June 2002, pp. 367-370, achieve phase shifter qualities of 12°/dB at 10 GHz with a control voltage of about 40 V therewith. The insertion losses of the LC, i.e. the losses caused only by the polarisation losses in the liquid crystal, are given as approximately 1 to 2 dB at 10 GHz in Weil, C.: Passiv steuerbare Mikrowellenphasenschieber auf der Basis nichtlinearer Dielektrika [Passively Controllable Microwave Phase Shifters based on Nonlinear Dielectrics], Darmstädter Dissertationen D17, 2002. In addition, it has been determined that the phase shifter losses are determined primarily by the dielectric LC losses and the losses at the waveguide junctions. T. Kuki, H. Fujikake, H. Kamoda and T. Nomoto: Microwave Variable Delay Line Using a Membrane Impregnated with Liquid Crystal. *IEEE MTT-S Int. Microwave Symp. Dig.* 2002, pp. 363-366, June 2002, and T. Kuki, H. Fujikake, T. Nomoto: Microwave Variable Delay Line Using Dual-Frequency Switching-Mode Liquid Crystal. *IEEE Trans. Microwave Theory Tech.*, Vol. 50, No. 11, pp. 2604-2609, November 2002, also address the use of polymerised LC films and dual-frequency switching-mode liquid crystals in combination with planar phase shifter arrangements.

A. Penirschke, S. Müller, P. Scheele, C. Weil, M. Wittek, C. Hock and R. Jakoby: "Cavity Perturbation Method for Characterization of Liquid Crystals up to 35 GHz", 34$^{th}$ European Microwave Conference—Amsterdam, pp. 545-548 describe, inter alia, the properties of the known single liquid crystal substance K15 (Merck KGaA, Germany) at a frequency of 9 GHz.

A. Gaebler, F. Goelden, S. Müller, A. Penirschke and R. Jakoby "Direct Simulation of Material Permittivites using an Eigen-Susceptibility Formulation of the Vector Variational Approach", 12MTC 2009—International Instrumentation and Measurement Technology Conference, Singapore, 2009 (IEEE), pp. 463-467, describe the corresponding properties of the known liquid crystal mixture E7 (likewise Merck KGaA, Germany).

DE 10 2004 029 429 A describes the use of liquid crystal media in microwave technology, inter alia in phase shifters. DE 10 2004 029 429 A has already investigated liquid crystal media with respect to their properties in the corresponding frequency range.

Liquid crystal media comprising for example compounds of the formula below,

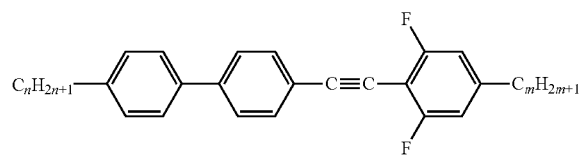

are used as a host mixture for the investigation of compounds, which are suggested for the usage in components for microwave applications and are described in F. Gölden, "Liquid Crystal Based Microwave Components with Fast Response Times: Materials, Technology, Power Handling Capability", Dissertation, Technische Universität Darmstadt, 2009, (D17), A. Lapanik, "Single compounds and mixtures for microwave applications, Dielectric, microwave studies on selected systems", Dissertation, Technische Universität Darmstadt, 2009, (D17), "Nematic LC mixtures with high birefringence in microwave region", A. Lapanik, F. Gölden, S. Müller, A. Penirschke, R. Jakoby und W. Haase, Frequenz 2011, 65, 15-19, "Highly birefringent nematic mixtures at room temperature for microwave applications", A. Lapanik, F. Gölden, S. Müller, R. Jakoby und W. Haase, *Journal of Optical Engineering*, published online, as well as in the laid-open documents DE 10 2010 045 370.6 und DE 10 2010 051 508.0.

Moreover, DE 10 2010 051 508.0 discloses the usage of oligo-phenylene compounds in combination with bistolane compounds in microwave applications.

Compounds of this formula

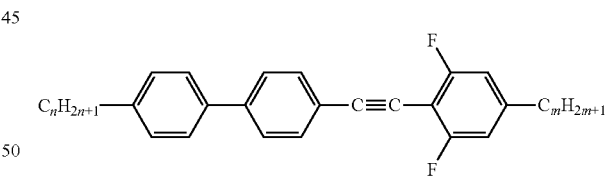

are also used as host mixture for the investigation of various compounds for microwave applications by A. Lapanik "Liquid crystal systems for microwave applications", Dissertation, Technische Universität Darmstadt, 2009. Some of the results of this work have been presented by A. Lapanik, F. Gölden, V. Lapanik, S. Müller, A. Penirschke, R. Jacoby and W. Haase at "38$^{th}$ Topical Meeting on Liquid Crystals", Mainz 2010 (Room Temperature nematic LC Mixtures with High Birefringence for Microwave Applications". WO 2011/009524 A1 discloses, besides others, also liquid crystal mixtures comprising compounds of this formula in fractions of up to one half and slightly above for use in high frequency components.

WO 2011/035863 A1 discloses liquid crystal mixtures comprising compounds of the formula

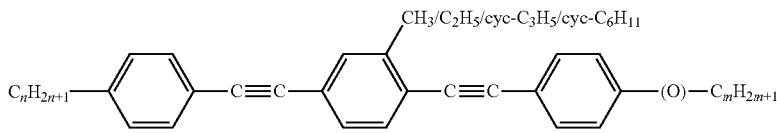

for use in high frequency components and does also mention the compounds shown above.

WO 2011/066905 A1 discloses liquid crystal mixtures comprising oligophenyl compounds of the formula

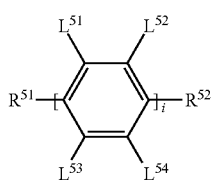

V with i=5 to 10, $R^{51}$ and $R^{52}$ alkyl and $L^{51}$ to $L^{54}$ mostly H and some of them or alkyl)

However, these compositions are afflicted with serious disadvantages. Most of them result, besides other deficiencies, in disadvantageously high losses and/or inadequate phase shifts or inadequate material quality.

For these applications, liquid crystal media having particular, hitherto rather unusual, uncommon properties, or combinations of properties, are required.

Novel liquid crystal media having improved properties are thus necessary. In particular, the loss in the microwave region must be reduced and the material quality ($\eta$) must be improved.

In this context, the dielectric anisotropy in the microwave region is defined as $$\Delta \epsilon_r \equiv (\epsilon_{r,\parallel} - \epsilon_{r,\perp}).$$

The tunability ($\tau$) is defined as $$\tau \equiv (\Delta \epsilon_r / \epsilon_{r,\parallel}).$$

The material quality ($\eta$) is defined as $$\eta \equiv (\tau / \tan \delta_{\epsilon,max.}), \text{ where}$$

the maximum dielectric loss is $$\tan \delta_{\epsilon_r,max.} \equiv \max.\{\tan \delta_{\epsilon_r,\perp}; \tan \delta_{\epsilon_r,\parallel}\}.$$

In addition, there is a demand for an improvement in the low-temperature behaviour of the components. Both an improvement in the operating properties and in the shelf life is necessary here.

There is therefore a considerable demand for liquid crystal media having suitable properties for corresponding practical applications.

Surprisingly, it has now been found that it is possible to achieve liquid crystal media having a suitably high $\Delta\epsilon$, a suitable, broad nematic phase range $\geq 140°$ C. and a high microwave tunability that do not have the disadvantages of the prior-art materials, or at least only do so to a considerably reduced extent.

These improved liquid crystal media in accordance with the present invention comprise a first component, component A, consisting of one, two, three or more, preferably of three or more, compounds of formula I

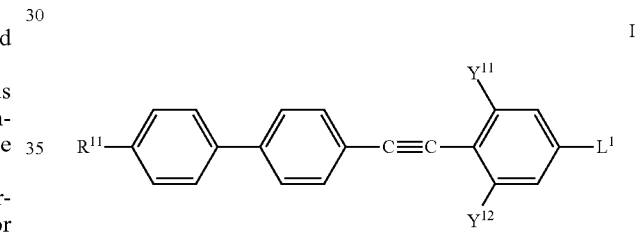

I wherein
$L^1$ denotes $R^{12}$ or $X^1$,
$R^{11}$ denotes $C_nH_{2n+1}$, O—$C_nH_{2n+1}$ or $CH_2$=CH—$(CH_2)_Z$, preferably $C_nH_{2n+1}$ or $CH_2$=CH—$(CH_2)_Z$, most preferably $C_nH_{2n+1}$,
$R^{12}$ denotes $C_mH_{2m+1}$, O—$C_mH_{2m+1}$ or $(CH_2)_Z$—CH=$CH_2$, preferably $C_mH_{2m+1}$ or $CH_2$=CH—$(CH_2)_Z$, most preferably $C_mH_{2m+1}$,
$X^1$ denotes F or Cl,
$Y^{11}$ and $Y^{12}$, are independently of one another H or F,
n and m independently of one another, denote an integer in the range from 1 to 9 and
z denotes 0, 1, 2, 3 or 4,
preferably in a total concentration of 10% or more, more preferably of 25% or more, to 95% or less more preferably to 90% or less and a second component, component B, consisting of one or more compounds selected from the group of compounds of formulae III to VI

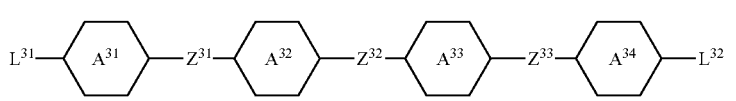

III wherein
L$^{31}$ denotes R$^{31}$ or X$^{31}$,
L$^{32}$ denotes R$^{32}$ or X$^{32}$,
R$^{31}$ and R$^{32}$, independently of one another, denote H, non-fluorinated alkyl or alkoxy having 1 to 15, preferably 3 to 10, C atoms or non-fluorinated alkenyl, alkenyloxy or alkoxyalkyl having 2 to 15, preferably 3 to 10, C atoms, preferably non-fluorinated alkyl or alkenyl,
X$^{31}$ and X$^{32}$, independently of one another, denote H, F, Cl, —CN, —NCS, —SF$_5$, fluorinated alkyl or fluorinated alkoxy having 1 to 7 C atoms or fluorinated alkenyl, non-fluorinated or fluorinated alkenyloxy or non-fluorinated or fluorinated alkoxyalkyl having 2 to 7 C atoms, preferably fluorinated alkoxy, fluorinated alkenyloxy, F or Cl,
Z$^{31}$ to Z$^{33}$, independently of one another, denote trans-CH=CH—, trans-CF=CF—, —C≡C— or a single bond, preferably one or more of them denotes a single bond, and particularly preferably all denote a single bond,

denotes

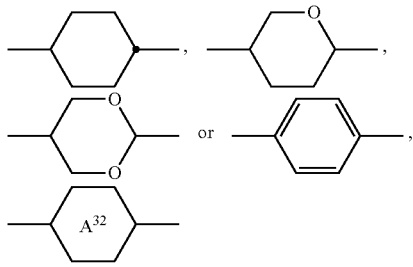

to

independently of one another, denote

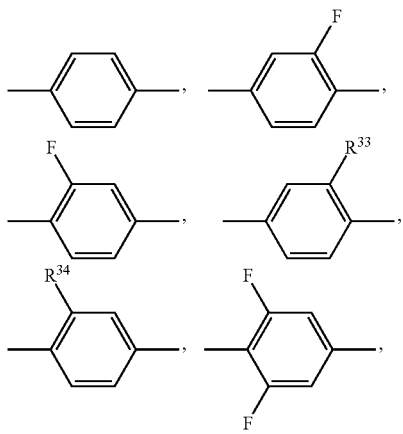

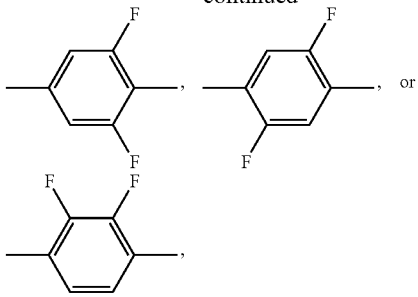

alternatively

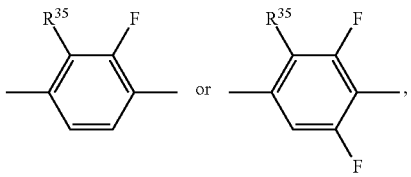

and
R$^{33}$ to R$^{35}$, independently of one another, non-fluorinated alkyl or alkoxy having 1 to 15, preferably 2 to 10, C atoms or non-fluorinated alkenyl, alkenyloxy or alkoxyalkyl having 2 to 15, preferably 3 to 10, C atoms, preferably non-fluorinated alkyl or alkenyl,

IV

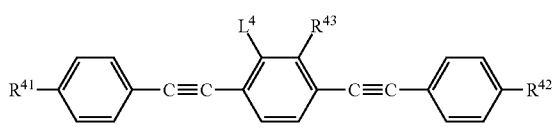

wherein
R$^{41}$ to R$^{43}$, independently of one another, denote non-fluorinated alkyl or non-fluorinated alkoxy, each having 1 to 15 C atoms, non-fluorinated alkenyl, non-fluorinated alkenyloxy or non-fluorinated alkoxyalkyl, each having 2 to 15 C atoms, or cycloalkyl, alkylcycloalkyl, cycloalkenyl, alkylcycloalkenyl, alkylcycloalkylalkyl or alkylcycloalkenylalkyl, each having up to 15 C atoms,
preferably R$^{41}$ and R$^{42}$, independently of one another, denote non-fluorinated alkyl or non-fluorinated alkoxy, each having 1 to 7 C atoms, or non-fluorinated alkenyl, non-fluorinated alkenyloxy or non-fluorinated alkoxyalkyl, each having 2 to 7 C atoms,
particularly preferably R$^{41}$ denotes non-fluorinated alkyl having 1 to 7 C atoms or non-fluorinated alkenyl, non-fluorinated alkenyloxy or non-fluorinated alkoxyalkyl, each having 2 to 7 C atoms, and
particularly preferably R$^{42}$ denotes non-fluorinated alkyl or non-fluorinated alkoxy, each having 1 to 7 C atoms, and
preferably R$^{43}$ denotes non-fluorinated alkyl having 1 to 5 C atoms, non-fluorinated cycloalkyl or cycloalkenyl having 3 to 7 C atoms, non-fluorinated alkylcyclohexyl or non-fluorinated cyclohexylalkyl, each having 4 to 12 C atoms, or non-fluorinated alkylcyclohexylalkyl having 5 to 15 C atoms, particularly preferably cyclopropyl, cyclobutyl or cyclohexyl and very particularly preferably n-alkyl, particularly preferably methyl, ethyl or n-propyl and $L^4$ denotes H, F, or non-fluorinated alkyl or non-fluorinated alkoxy, each having 1 to 15 C atoms, non-fluorinated alkenyl, non-fluorinated alkenyloxy or non-fluorinated alkoxyalkyl, each having 2 to 15 C atoms, or cycloalkyl, alkylcycloalkyl, cycloalkenyl, alkylcycloalkenyl, alkylcycloalkylalkyl or alkylcycloalkenylalkyl, each having up to 15 C atoms, $L^{51}$ to $L^{54}$ present have a meaning other than H, and they preferably denote alkyl, and $R^{51}$ denotes $C_nH_{2n+1}$ or $CH_2=CH-(CH_2)_z$, and $R^{52}$ denotes $C_mH_{2m+1}$ or $O-C_mH_{2m+1}$ or $(CH_2)_z-CH=CH_2$, and wherein n and m, independently of one another, denote an integer in the range from 1 to 15, preferably in the range from 1 to 7 and particularly preferably 1 to 5, and z denotes 0, 1, 2, 3 or 4, preferably 0 or 2 and

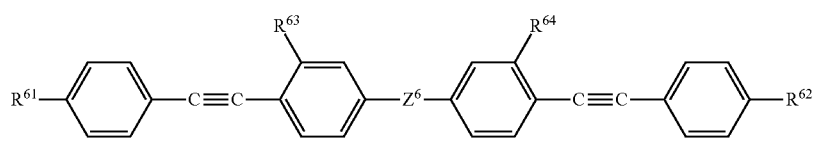

VI

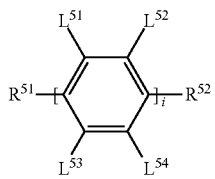

V wherein $R^{61}$ and $R^{62}$, independently of one another, denote halogen, non-fluorinated alkyl or fluorinated alkyl or non-fluorinated alkoxy or fluorinated alkoxy, each having 1 to 15 C atoms, or non-fluorinated alkenyl or fluorinated alkenyl, non-fluorinated alkenyloxy or non-fluorinated alkoxyalkyl or fluorinated alkoxyalkyl, each having 2 to 15 C atoms, in which, in addition, one or more "—$CH_2$—" groups may be replaced, independently of one another, by cycloalkyl having 3 to 6 C atoms, $R^{63}$ and $R^{64}$, independently of one another, denote alkyl having 1 to 15 C atoms, and, alternatively, one of them also denotes H, $Z^6$ denotes —C≡C— or a single bond.

wherein $R^{51}$ and $R^{52}$, independently of one another, denote halogen, preferably F or Cl, non-fluorinated alkyl or fluorinated alkyl or non-fluorinated alkoxy or fluorinated alkoxy, each having 1 to 15 C atoms, or non-fluorinated alkenyl or fluorinated alkenyl, non-fluorinated alkenyloxy or non-fluorinated alkoxyalkyl or fluorinated alkoxyalkyl, each having 2 to 15 C atoms, in which, in addition, one or more "—$CH_2$—" groups may be replaced, independently of one another, by cycloalkyl having 3 to 6 C atoms, preferably having 4 or 6 C atoms, and alternatively, in addition, one of $R^{11}$ and $R^{12}$ or both $R^{11}$ and $R^{12}$ denote H, preferably $R^{51}$ and $R^{52}$, independently of one another, denote non-fluorinated alkyl or non-fluorinated alkoxy, each having 1 to 7 C atoms, or non-fluorinated alkenyl, non-fluorinated alkenyloxy or non-fluorinated alkoxyalkyl, each having 2 to 7 C atoms, particularly preferably $R^{51}$ denotes non-fluorinated alkyl having 1 to 7 C atoms or non-fluorinated alkenyl, non-fluorinated alkenyloxy or non-fluorinated alkoxyalkyl, each having 2 to 7 C atoms, and particularly preferably $R^{52}$ denotes non-fluorinated alkyl or non-fluorinated alkoxy, each having 1 to 7 C atoms, and $L^{51}$ to $L^{54}$ on each appearance, in each case independently of one another, denote H, alkyl having 1 to 15 C atoms, F or Cl, and i denotes an integer in the range from 5 to 15, preferably from 5 or 8 to 12 and particularly preferably from 5 or 9 to 10, and preferably at least two of the substituents The invention further relates to a component for high-frequency technology comprising a liquid crystal medium as described above and below. In this context, both high frequency technology and hyper frequency technology denote applications having frequencies in the range from 1 MHz to 1 THz, preferably from 1 GHz to 500 GHz, more preferably 2 GHz to 300 GHz, particularly preferably from about 5 to 150 GHz comprising a component for high-frequency technology comprising a liquid crystal medium as described above and below, suitable for operation in the microwave range.

The invention further relates to the use of liquid crystal media as described above and below in a component for high-frequency technology.

The invention further relates to a microwave device, comprising a component as described above and below.

Said devices and components include, without limitation, phase shifters, varactors, wireless and radio wave antenna arrays, matching circuit adaptive filters and others.

In particular, the liquid crystal media of this invention show the following advantageous properties.

They preferably exhibit:

a high birefringence Δn, usually an Δn 0.340 or more and/or broad nematic phase ranges usually up to 140° C. or more and/or a high dielectric anisotropy Δε, usually 1.0 or more and/or phase shifter qualities of 15°/dB or more and/or high values for the material quality (η) of 5 or more.

The liquid crystal media of this invention are formulated to meet the above criteria. The media are also especially suitable for mass production and can be processed using industry standard equipment.

In another preferred embodiment, the terminal straight alkyl chain groups of compounds of formula I are substituted by preferably halogen, -alkoxy, -alkenyl, -alkinyl, —NCS and —SF$_5$, which are not explicitly mentioned above and can optionally and advantageously also be used in the media in accordance with the present invention.

Very preferred are liquid crystal media, comprising additionally one or more compounds of formula II

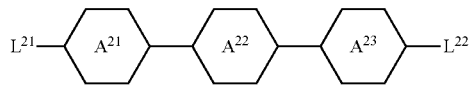
II wherein
L$^{21}$ denotes R$^{21}$ or X$^{21}$,
L$^{22}$ denotes R$^{22}$ or X$^{22}$,
R$^{21}$ and R$^{22}$, independently of one another, denote H, non-fluorinated alkyl or non-fluorinated alkoxy having 1 to 17, preferably having 3 to 10, C atoms or non-fluorinated alkenyl, non-fluorinated alkenyloxy or non-fluorinated alkoxyalkyl having 2 to 15, preferably 3 to 10, C atoms, preferably alkyl or non-fluorinated alkenyl,
X$^{21}$ and X$^{22}$, independently of one another, denote H, F, Cl, —CN, —NCS, —SF$_5$, fluorinated alkyl or fluorinated alkoxy having 1 to 7 C atoms or fluorinated alkenyl, non-fluorinated or fluorinated alkenyloxy or non-fluorinated or fluorinated alkoxyalkyl having 2 to 7 C atoms, preferably fluorinated alkoxy, fluorinated alkenyloxy, F or Cl, and

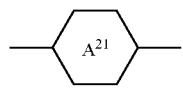

to

independently of one another, denote

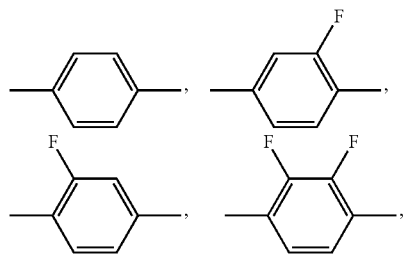

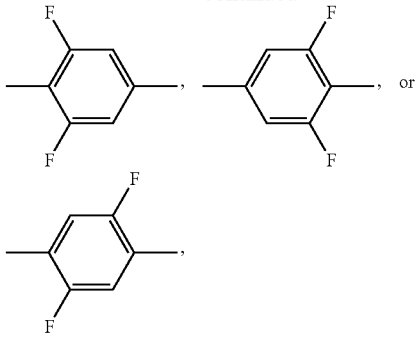

preferably

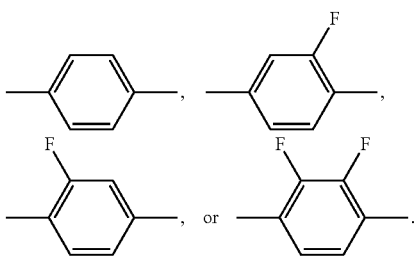

Compounds of formula II are characterized by an acceptable optical anisotropy, high positive dielectric anisotropy, therefore good addressability and broad nematic phases.

In a preferred embodiment the compounds of formula II are compounds of formula II-1:

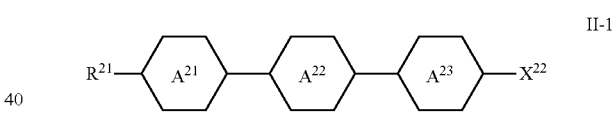
II-1 wherein the parameters have the respective meanings indicated above for formula II and preferably
R$^{21}$ denotes non-fluorinated alkyl having 1 to 7 C atoms or non-fluorinated alkenyl having 2 to 7 C atoms,
X$^{22}$, denotes F, Cl, —OCF$_3$, —CF$_3$, —CN, —NCS or —SF$_5$, preferably F, Cl, —OCF$_3$ or —CN.

The compounds of formula II-1 preferably are compounds of formula II-1a:

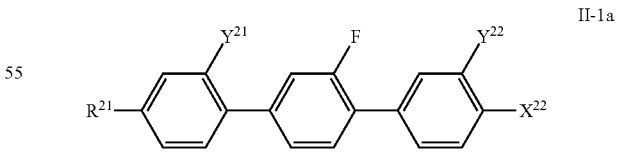
II-1a wherein the parameters have the respective meanings indicated above for formula II-1 and in which
Y$^{21}$ and Y$^{22}$ each, independently of one another, denote H or F, and preferably
R$^{21}$ denotes alkyl or alkenyl, and
X$^{22}$ denotes F, Cl or —OCF$_3$.

The compounds of formula II-1a are preferably selected from the group of the compounds of the formulae II-1a-1 to II-1a-4, preferably selected from the group of the compounds of the formulae II-1a-1 and II-1a-2, more preferably these compounds of the formula II-1a predominantly consist, even more preferably essentially consist and very particularly preferably completely consist thereof:

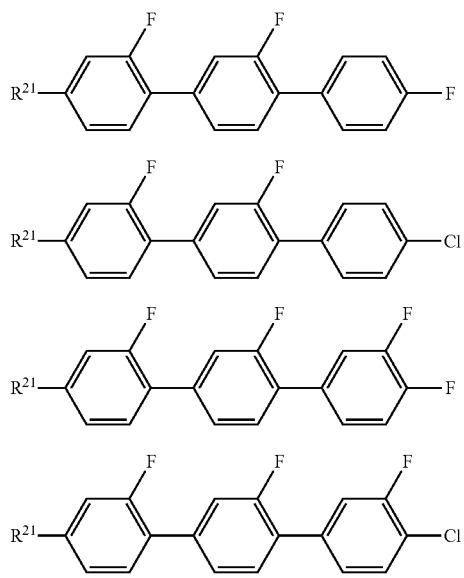

wherein
R$^{21}$ has the meaning indicated above and preferably denotes C$_o$H$_{2o+1}$, in which
o denotes an integer in the range from 1 to 15, preferably in the range from 1 to 7 and particularly preferably 1 to 5.

The liquid crystal media in accordance with the present invention can preferably comprise one or more compounds of formula III. Compounds of formula III are characterized by an acceptable optical anisotropy, high positive dielectrical anisotropy, therefore good tunability and broad nematic phases.

The compounds of formula III are preferably selected from the group of the compounds of formulae III-1, preferably these compounds of formula III predominantly consist, more preferably essentially consist and even more preferably completely consist thereof:

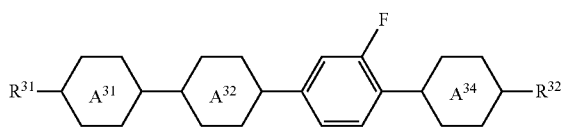

wherein the parameters have the respective meanings indicated above under formula III and preferably one of

to

denotes

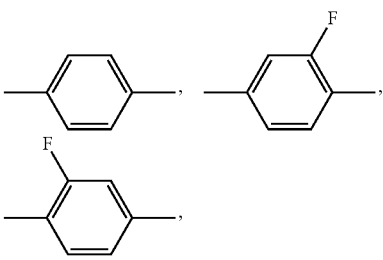

R$^{31}$ has the meaning indicated above and preferably denotes C$_n$H$_{2n+1}$ or CH$_2$=CH—(CH$_2$)$_Z$, and
R$^{32}$ has the meaning indicated above and preferably denotes C$_m$H$_{2m+1}$ or O—C$_m$H$_{2m+1}$ or (CH$_2$)$_Z$—CH=CH$_2$, and in which
n and m, independently of one another, denote an integer in the range from 1 to 15, preferably in the range from 1 to 7 and particularly preferably 1 to 5, and
z denotes 0, 1, 2, 3 or 4, preferably 0 or 2.

The preferred combinations of (R$^{31}$ and R$^{32}$) here are, in particular, (C$_n$H$_{2n+1}$ and C$_m$H$_{2m+1}$).

The compounds of formula III-1 are preferably compounds of formula III-1-1:

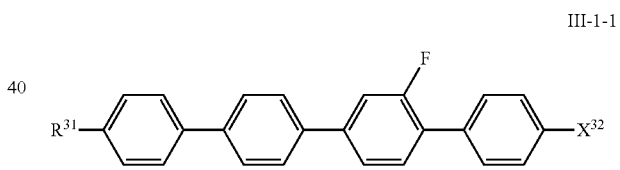

wherein the parameters have the meaning given above and preferably
R$^{31}$ has the meaning indicated above and preferably denotes C$_n$H$_{2n+1}$, and
n denotes an integer in the range from 1 to 15, preferably in the range from 1 to 7 and particularly preferably 1 to 5, and
X$^{32}$ preferably denotes F or Cl.

The compounds of formula III, besides those of formula III-1, are particularly preferably selected from the group of the compounds of the following formulae III-2 to III-6, and these compounds more preferably predominantly consist thereof, even more preferably essentially consist thereof and very particularly preferably completely consist thereof:

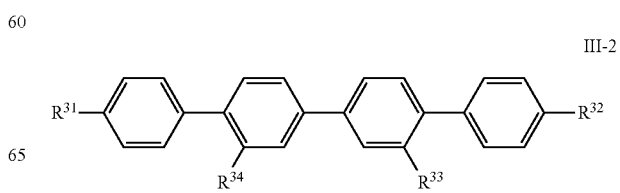

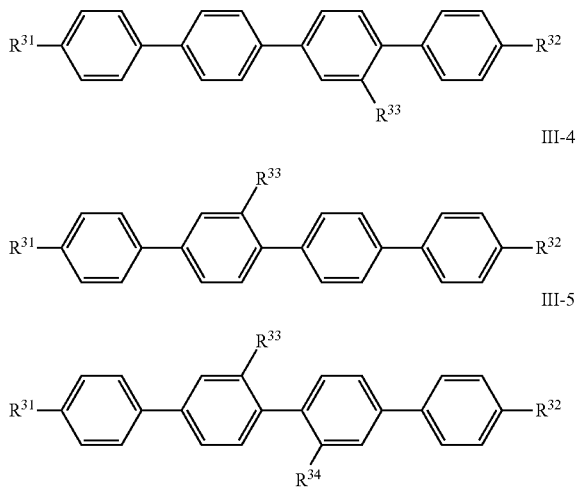

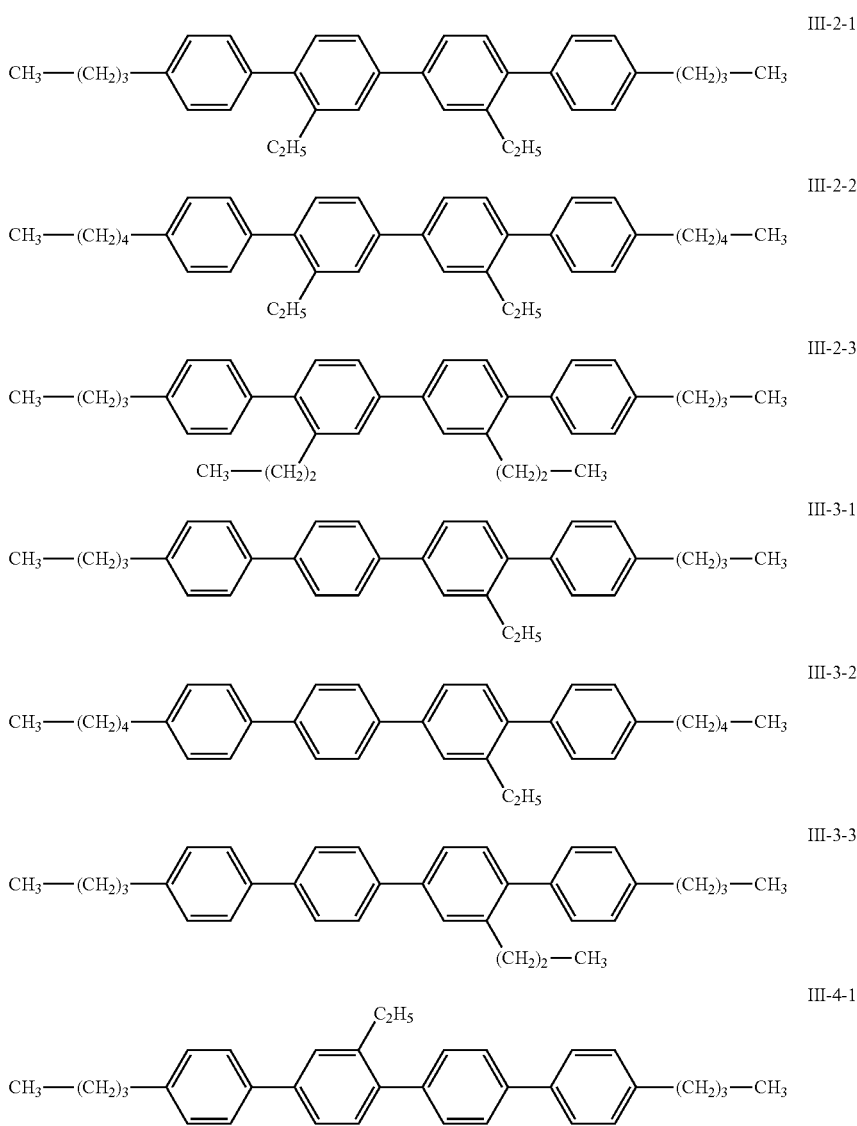

wherein the parameters have the respective meanings given under formula III above.

These compounds are most preferably selected from the group of their following respective sub-formulae, more preferably these compounds predominantly consist thereof, even more preferably essentially consist thereof and very particularly preferably completely consist thereof -continued III-4-2
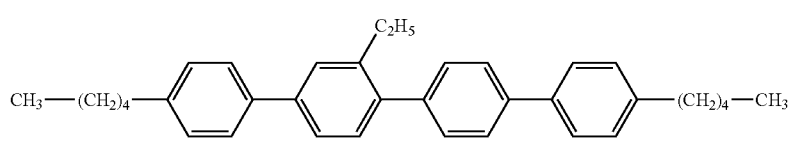

III-4-3
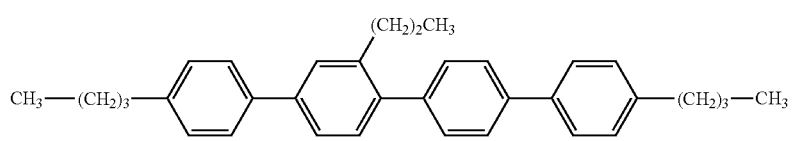

III-5-1
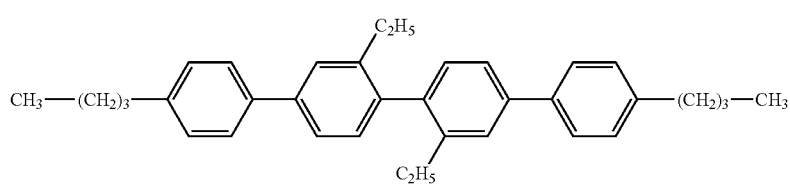

III-5-2
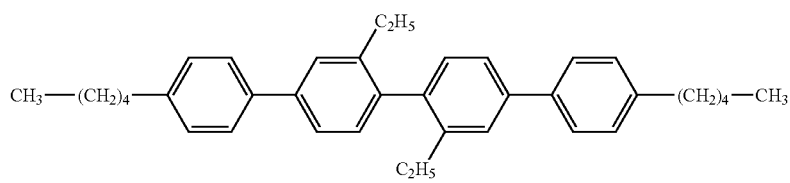

III-5-3
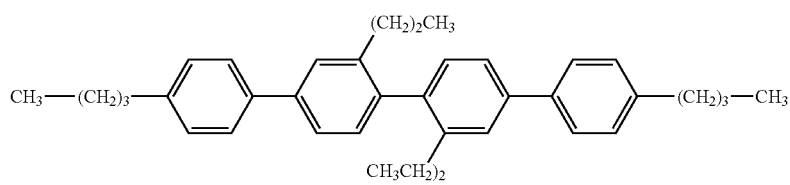

III-6-1
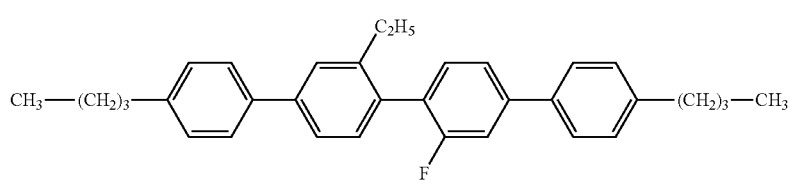

III-6-2
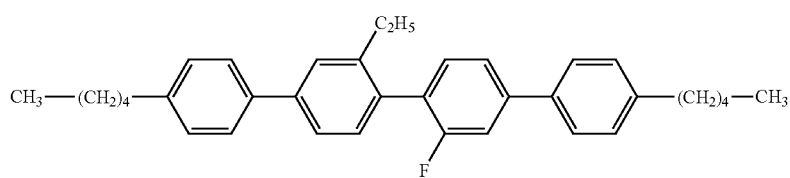

III-6-3
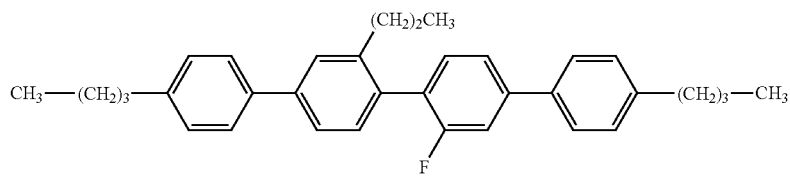

In another preferred embodiment, the liquid crystal media according to present invention comprise one or more compounds of formula IV. Compounds of formula IV are characterized by high optical anisotropy, excellent microwave characteristics and broad nematic phases. The compounds of formula IV are particularly preferably selected from the group of the compounds of the formulae IV-1 to IV-6, preferably of the formulae IV-1 and/or IV-2 and/or IV-3 and/or IV-4 and/or IV-5 and/or IV-6, preferably of the formulae IV-2 and/or IV-3 and/or IV-5 and/or IV-6, these compounds more preferably predominantly consist thereof, even more preferably essentially consist thereof and very particularly preferably completely consist thereof:

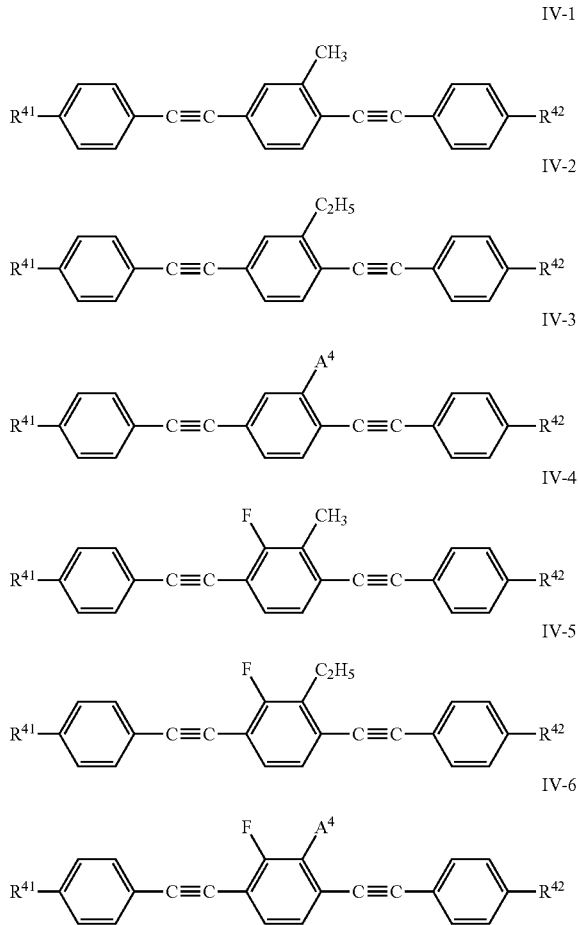

to 15 five-, six- or seven-membered rings, preferably 1,4-linked phenylene rings, which may optionally be substituted, preferably of formula V. Compounds of formula V are characterized by high optical anisotropy and excellent microwave characteristics.

The present invention likewise relates to the compounds of formula V in which $R^{51}$ and $R^{52}$ both have a meaning other than H.

Preference is given to compounds of formula V wherein in the case where i is equal to 6 to 8, $L^{51}$ to $L^{54}$ on each appearance, in each case independently of one another, denote H, alkyl having 1 to 8 C atoms, particularly preferably having 2 to 5 C atoms, F or Cl, and preferably, at least two of the substituents $L^{51}$ to $L^{54}$ present denote alkyl, in the case where i is equal to 9 to 12, $L^{51}$ to $L^{54}$ on each appearance, in each case independently of one another, denote H, alkyl having 3 to 10 C atoms, particularly preferably having 4 to 8 C atoms, F or Cl, and preferably at least three, particularly preferably at least four, of the substituents $L^{51}$ to $L^{54}$ present denote alkyl, in the case where i is equal to 13 to 15, $L^{51}$ to $L^{54}$ on each appearance, in each case independently of one another, denote H, alkyl having 5 to 15 C atoms, particularly preferably having 6 to 12 C atoms, F or Cl, and i denotes an integer in the range from 5 to 15, preferably from 5 or 8 to 12 and particularly preferably from 5 or 9 to 10, and preferably at least four, particularly preferably at least six, of the substituents $L^{51}$ to $L^{54}$ present denote alkyl.

The compounds of formula V are preferably selected from the group of the compounds of the formulae VA and VB. The compounds of formula V preferably predominantly consist thereof, more preferably essentially consist thereof and even more preferably completely consist thereof:

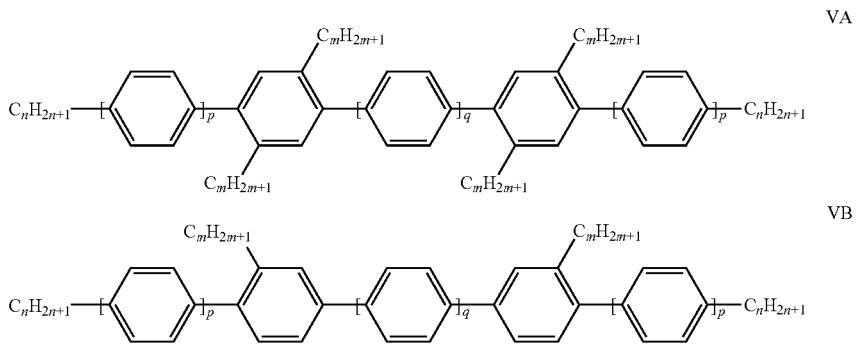

wherein $A^4$ denotes cycloalkyl having 3 to 6 C atoms, preferably cyclopropyl, cyclobutyl or cyclohexyl, particularly preferably cyclopropyl or cyclohexyl and very particularly preferably cyclopropyl, and the other parameters have the respective meanings indicated above for formula I and preferably $R^{41}$ denotes non-fluorinated alkyl having 1 to 7 C atoms, and $R^{42}$ denotes non-fluorinated alkyl having 1 to 7 C atoms or non-fluorinated alkoxy having 1 to 7 C atoms.

In another preferred embodiment, the liquid crystal media can additionally comprise one or more compounds having 5 wherein n and m, independently of one another, denote an integer from 1 to 15, preferably 3 to 12, p denotes an integer from 1 to 4, preferably 1 or 2, most preferably 2 p denotes an integer from 1 to 6, preferably 1, 2 or 4, and (p+q) denotes an integer from 3 to 12, preferably 3, 4, 6 or 8.

Especially preferred are compounds of formula VA selected from the group of the compounds of the formulae VA-1 to VA-3:

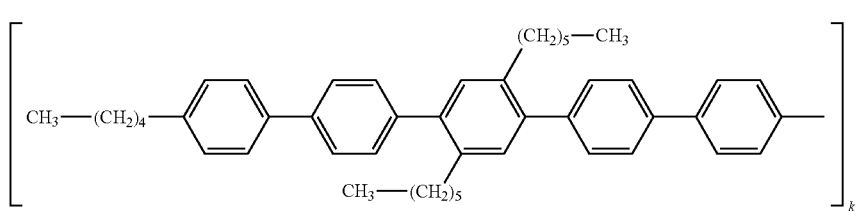
VA-1
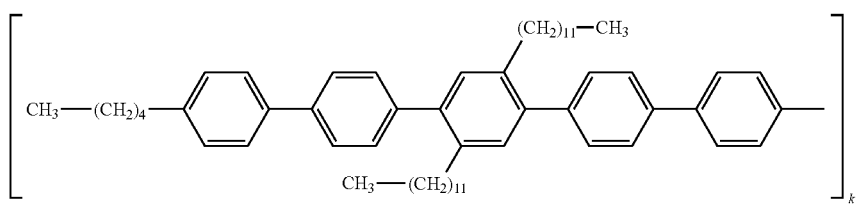
VA-2
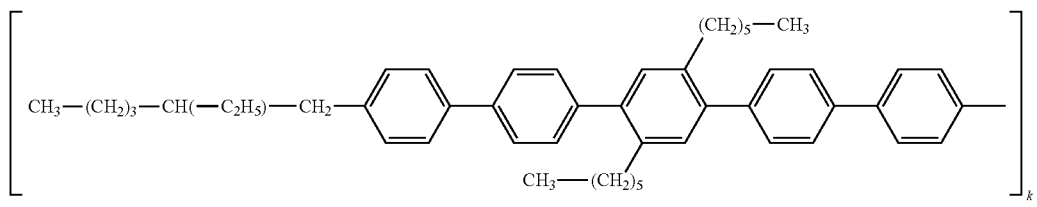
VA-3
wherein
k denotes 2.
Preferred compounds of formula VB are selected from the group of the compounds of the formulae VB-1 to VB-4, preferably of formulae VB-1 and VB-2:
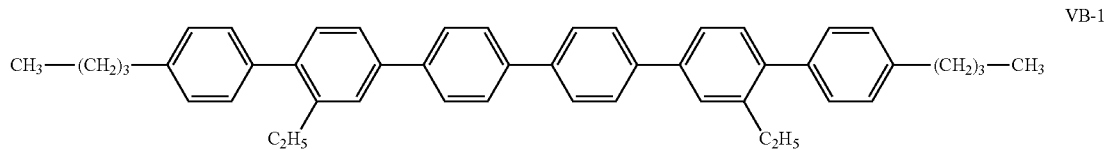
VB-1
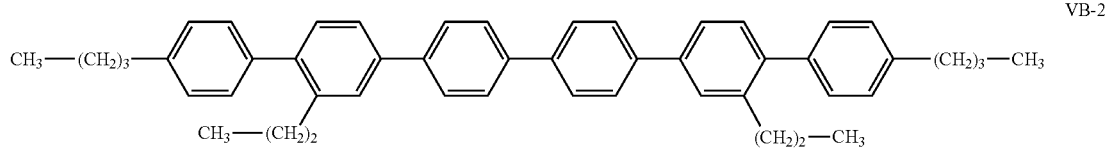
VB-2
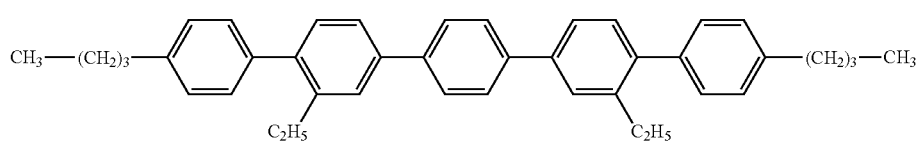
VB-3
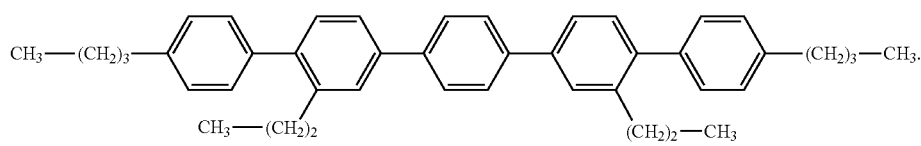
VB-4
Preferred compounds of formula VI are selected from the group of the compounds of the formulae VI-1 and VI-2:
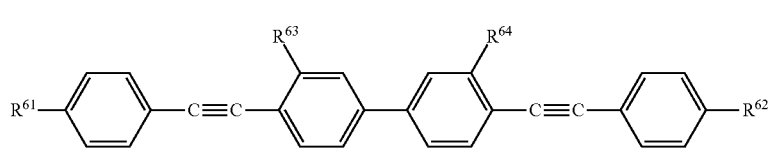
VI-1

-continued

VI-2

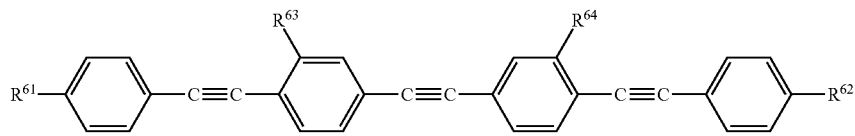

wherein the parameters have the meanings given under formula VI above.

In a preferred embodiment of the present invention the liquid crystalline media comprise one or more compounds of formula VI-1, preferably selected from the group of compounds of formulae VI-1-1 to VI-1-6, more preferably of formulae VI-1-2 and/or VI-1-5

VI-1-1

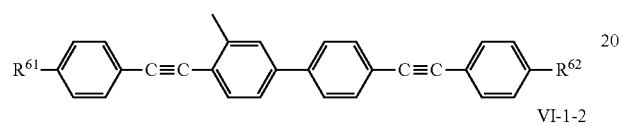

VI-1-2

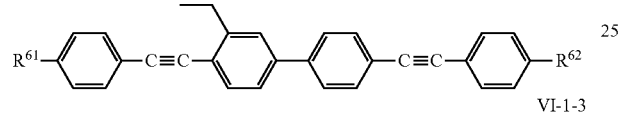

VI-1-3

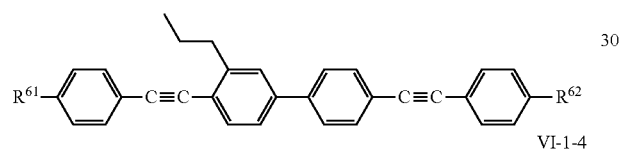

VI-1-4

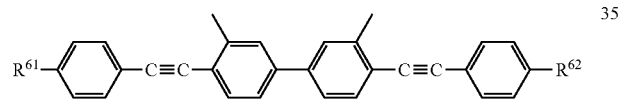

-continued

VI-1-5

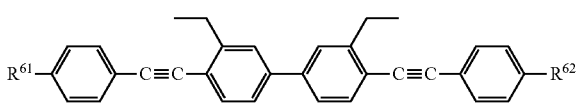

VI-1-6

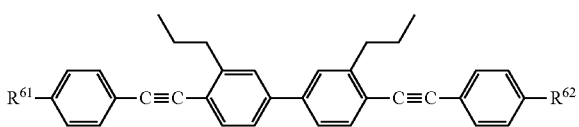

wherein the parameters have the meanings given under formula VI-1 above and preferably $R^{61}$ and $R^{62}$ independently of one another denote alkyl having 2 to 7 C atoms, as preferably propyl, butyl, pentyl or hexyl, more preferably propyl or hexyl, and most preferably both are identical to each other.

In a preferred embodiment of the present invention the liquid crystalline media comprise one or more compounds of formula VI-2, preferably selected from the group of compounds of formulae VI-2-1 to VI-2-6, preferably of formulae VI-2-2 and/or VI-2-5

VI-2-1

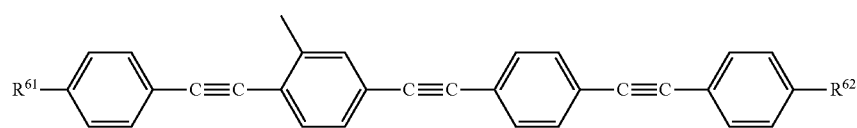

VI-2-2

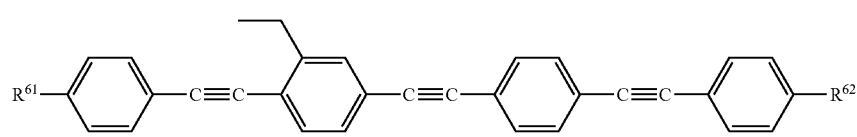

VI-2-3

VI-2-4

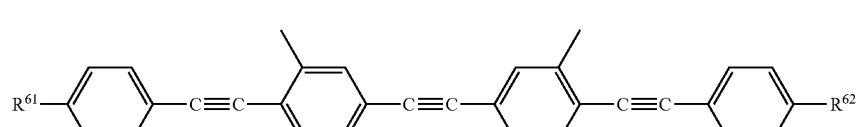

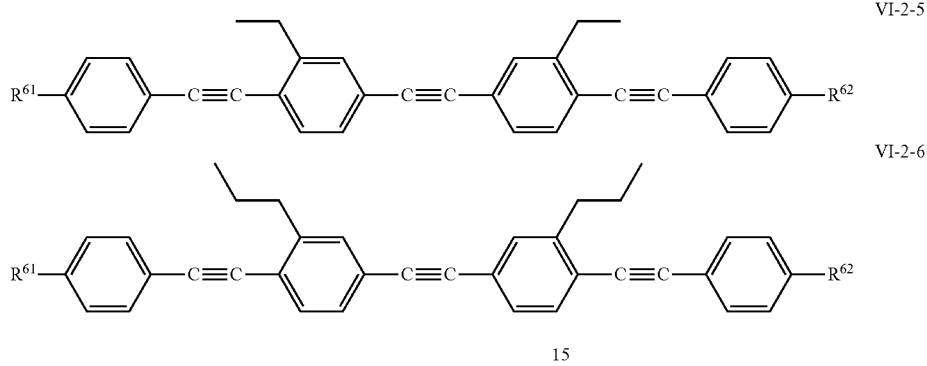

wherein the parameters have the meanings given under formula VI-2 above and preferably $R^{61}$ and $R^{62}$ independently of one another denote alkyl having 2 to 7 C atoms, as e.g. preferably propyl, butyl, pentyl or hexyl, more preferably propyl or hexyl, and most preferably both are identical to each other.

The compounds of formula IV may be prepared according to the following exemplary reaction schemes (Schemes 1 to 4):

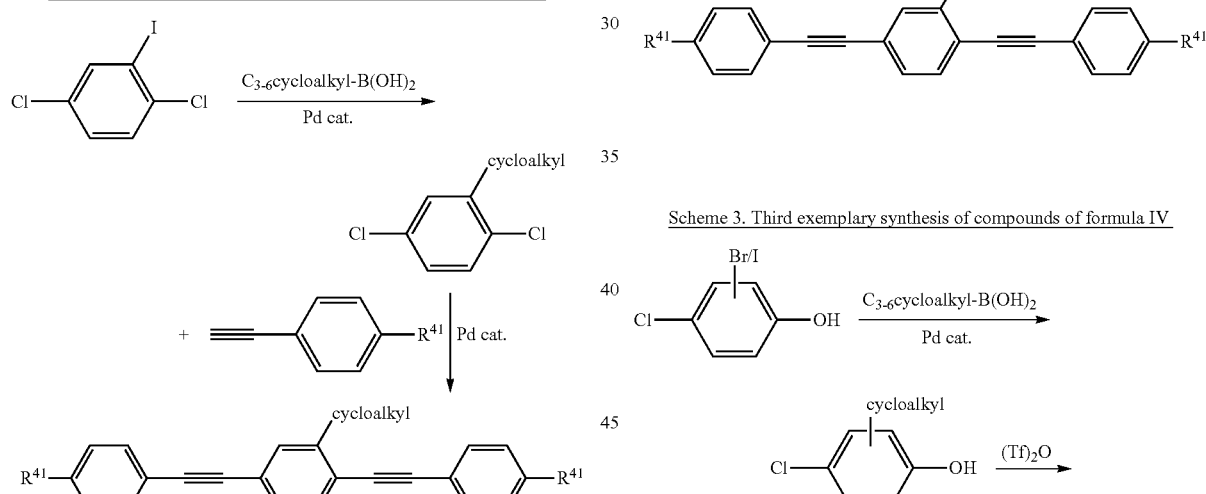

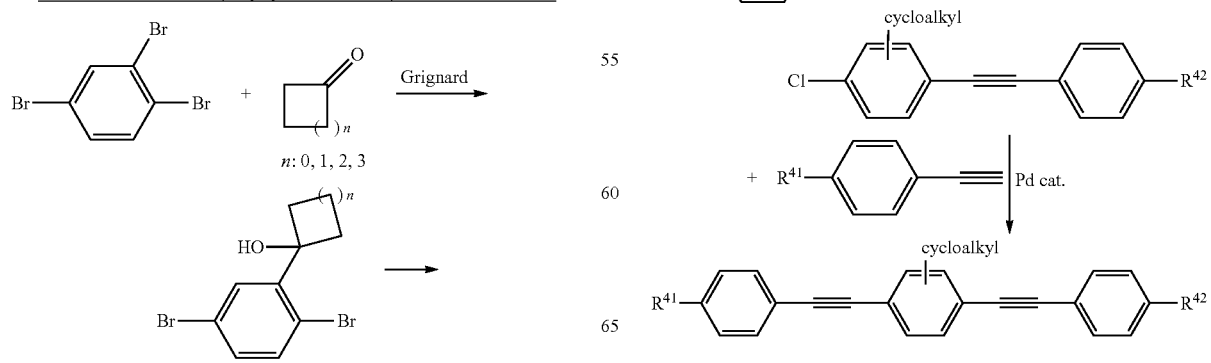

Scheme 4. Fourth exemplary synthesis of compounds of formula IV

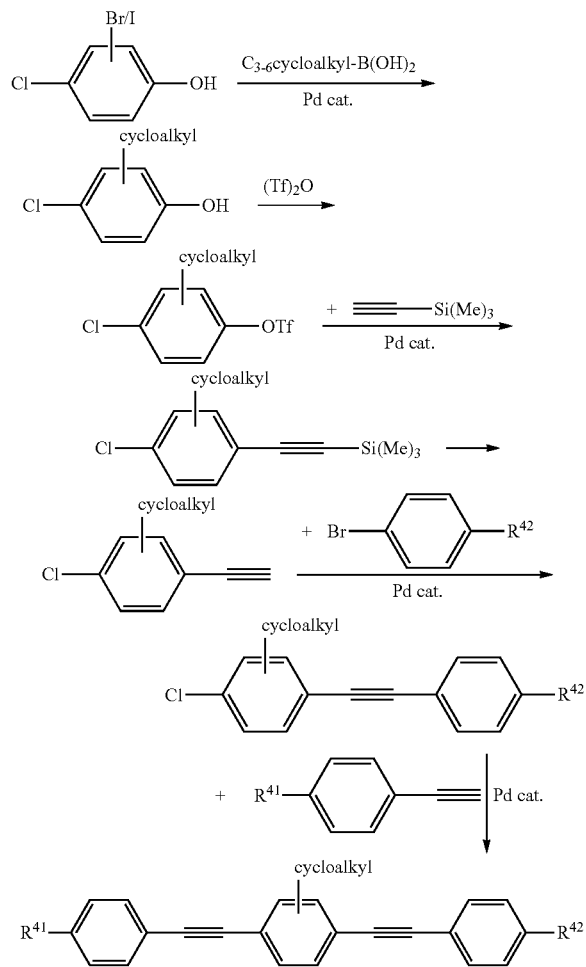

The compounds of formula IV having an ortho-substituent may be prepared according to the following synthesis schemes (Schemes 5 to 11). The parameters $L^4$, $R^{41}$ and $R^{42}$ and therein are as defined above and below, $X^4$ has the meaning given for $R^{43}$ above and R has the meaning given for $R^{41}$ respectively $R^{42}$.

Scheme 5. Fifth exemplary synthesis of compounds of formula IV

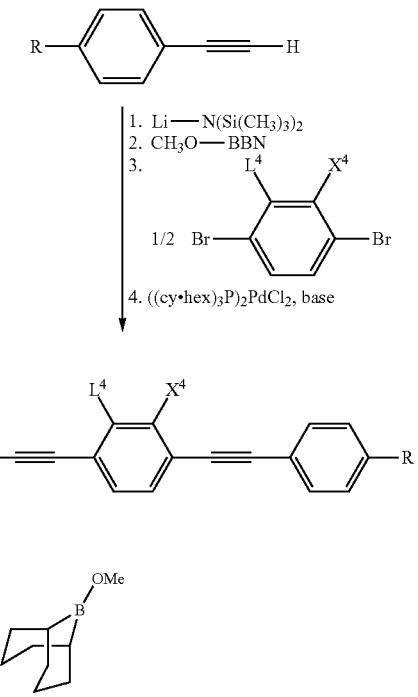

Scheme 6. Sixth exemplary synthesis of compounds of formula IV

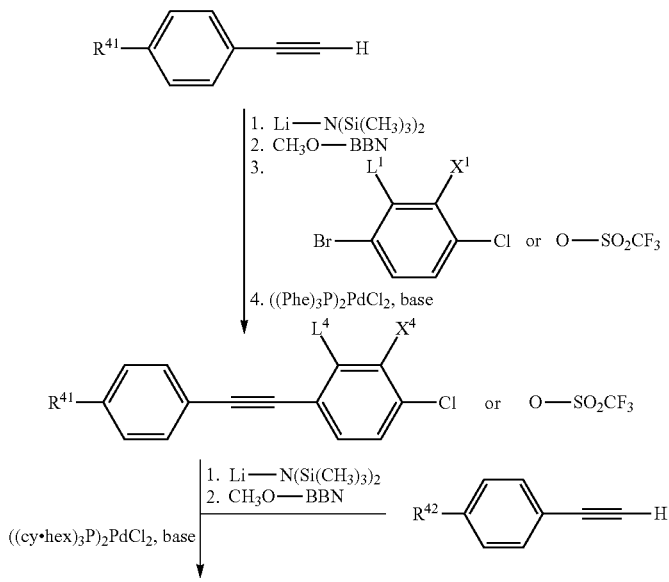

-continued
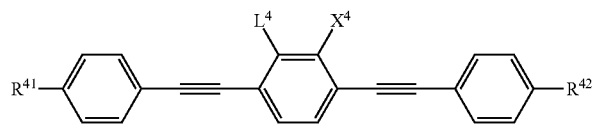
Schemes 7 to 11 show the synthesis of compounds with differently substituted central rings. The phenylalkinyl moieties shown therein may be generalised to arbitrarily substituted phenylalkinyl moieties.
Scheme 7. Seventh exemplary synthesis of compounds of formula IV
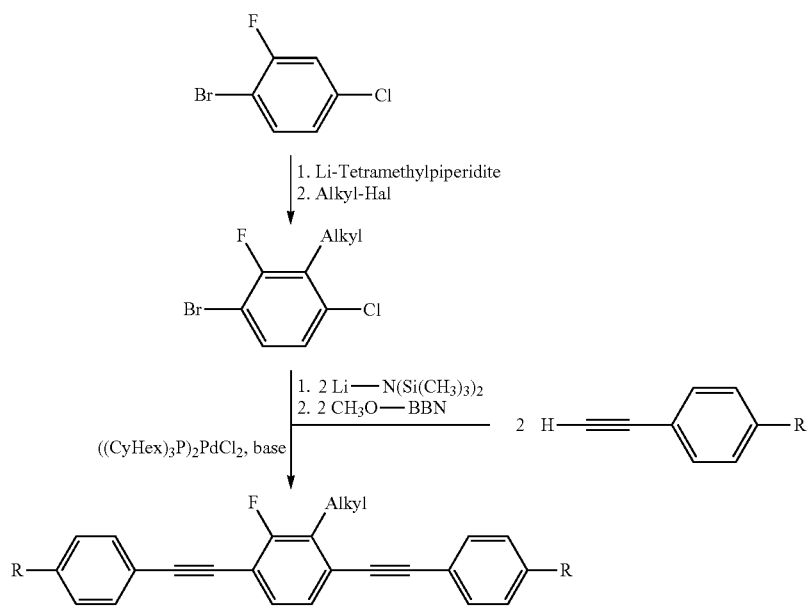
Scheme 8. Eight exemplary synthesis of compounds of formula IV
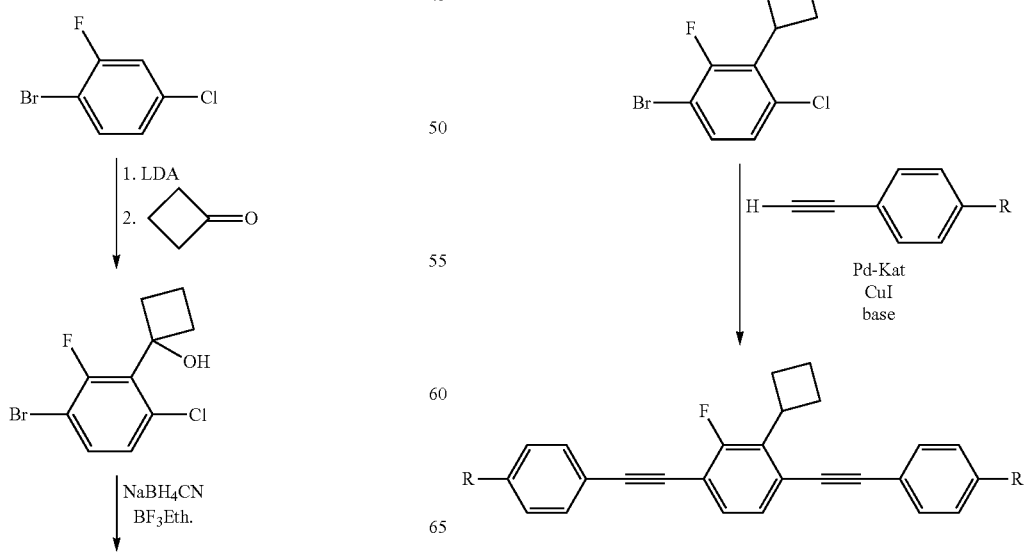

Scheme 9. Ninth exemplary synthesis of compounds of formula IV
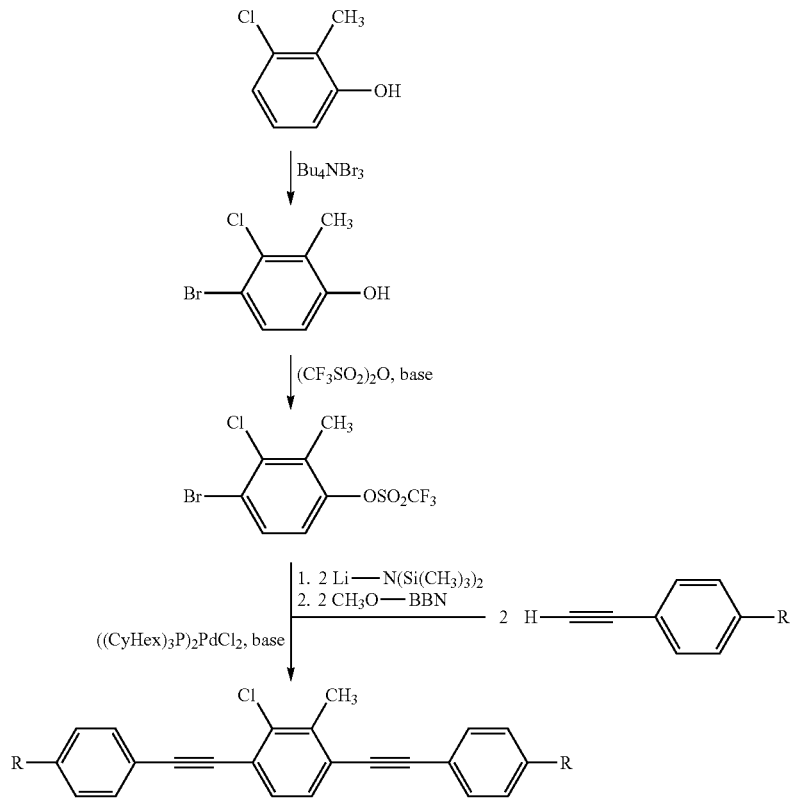
Scheme 10. Tenth exemplary synthesis of compounds of formula IV
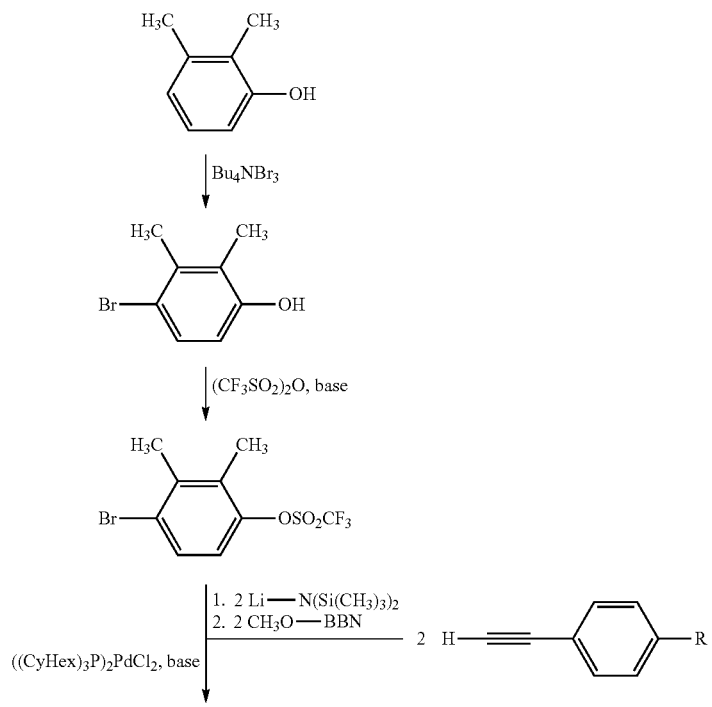

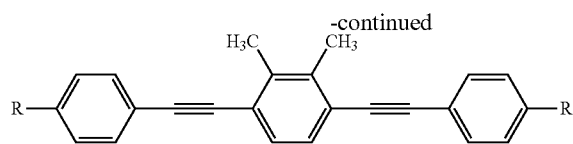

Scheme 11. Eleventh exemplary synthesis of compounds of formula IV

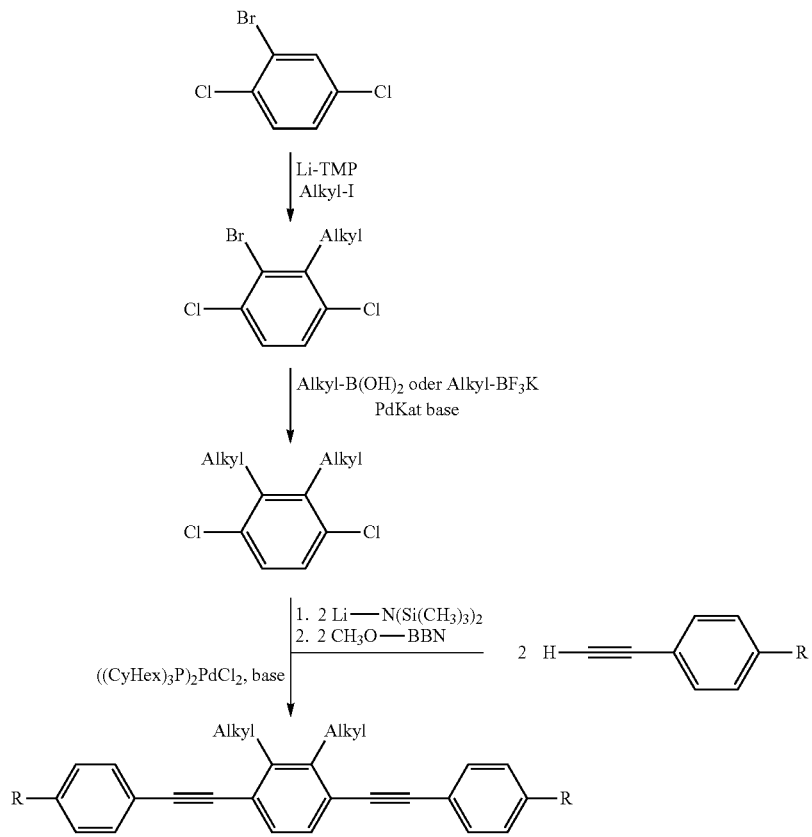

The compounds of formulae V may be prepared advantageously according to the following four reaction schemes (Schemes 12 to 15). The compounds of formula V having i=6, respectively i=10, for example may be prepared advantageously according to the schemes 14 and 15.

Scheme 12. First exemplary synthesis of compounds of formula V

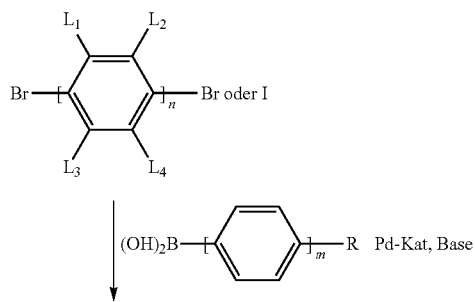

-continued
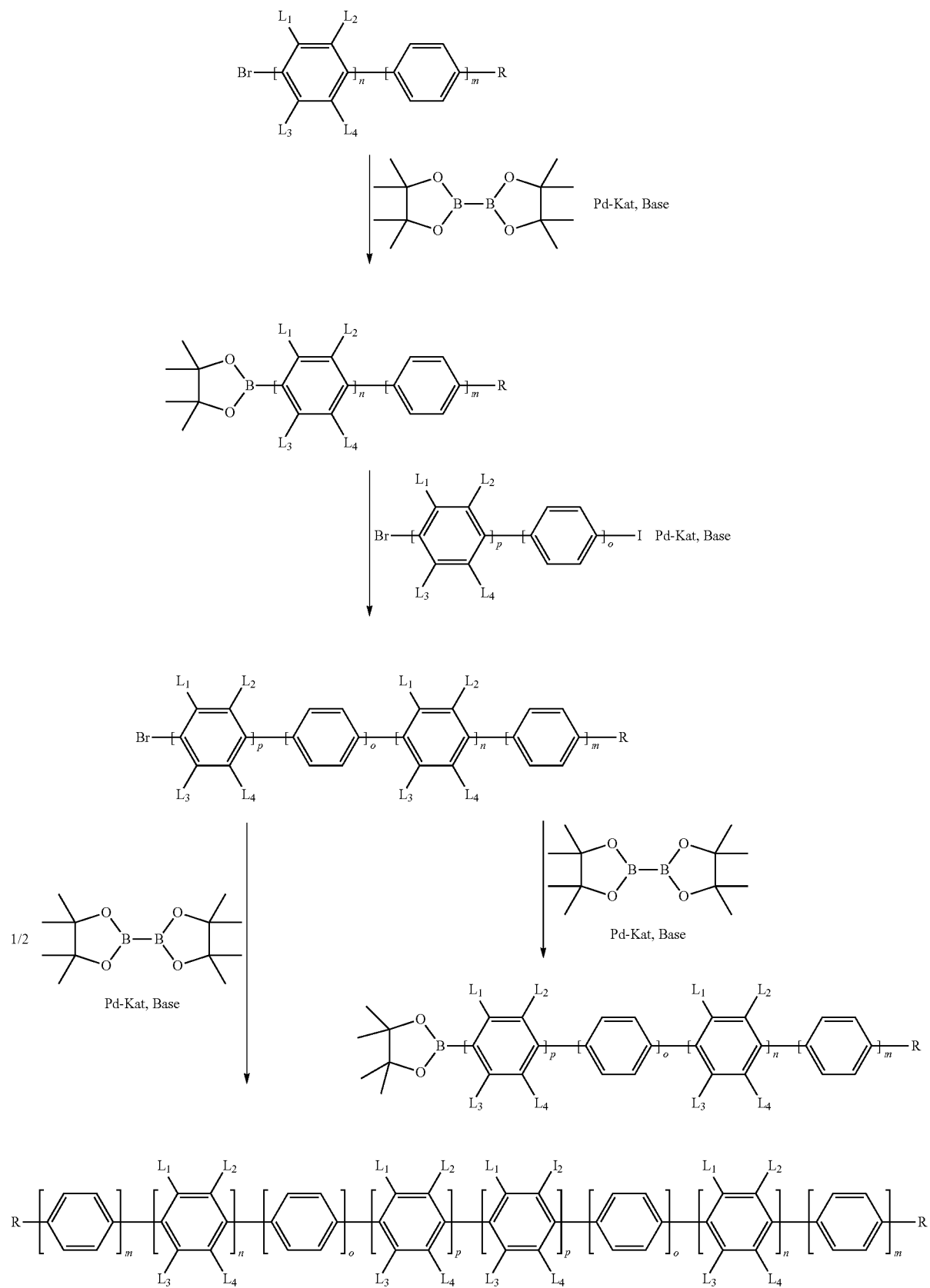

Scheme 13. Second exemplary synthesis of compounds of formula V

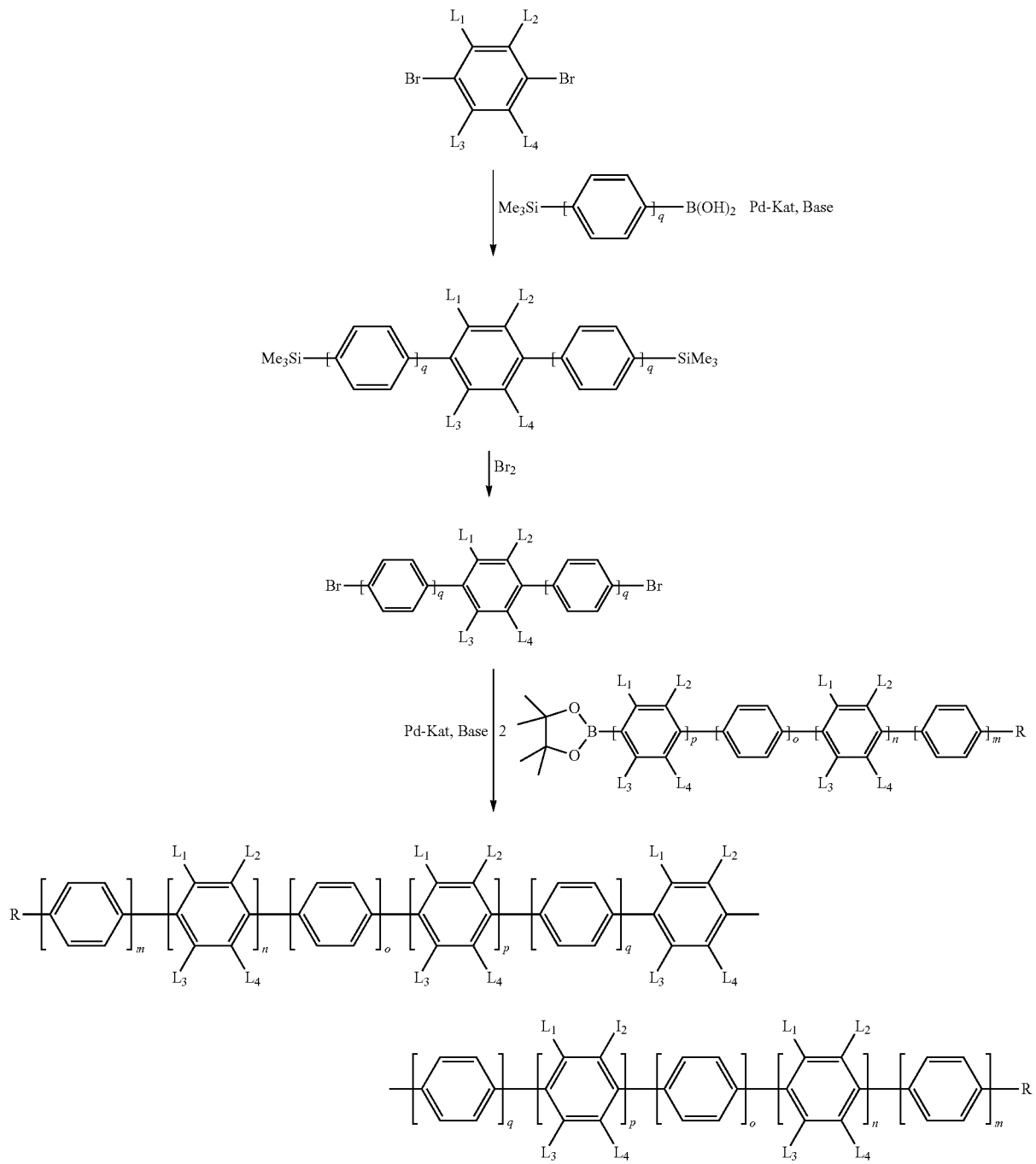

In schemes 12 and 13
both R independently of one another have the meaning given under formula V above for $R^{51}$,
$L_i$ each independently of one another have one of the meanings given under formula V above for $L^{5i}$, i.e.
$L_1$ those for $L^{51}$ up to
$L_4$ those for $L^{54}$,
m, n, o, p and q 0, 1, or 2 and
the sum (m+n+o+p+q) is 3 to 7.

Compounds having a lateral methyl substituent may be prepared according to scheme 12. The required reagent, bromine-iodine-toluene, is commercially available. Alternatively, the compounds may be prepared analogously to scheme 14. Then the second step, the reaction of the aldehyde with the Grignard compound may be skipped. In this case, the aldehyde is reduced directly to the methyl compound.

Scheme 14. Third exemplary synthesis of compounds of formula V

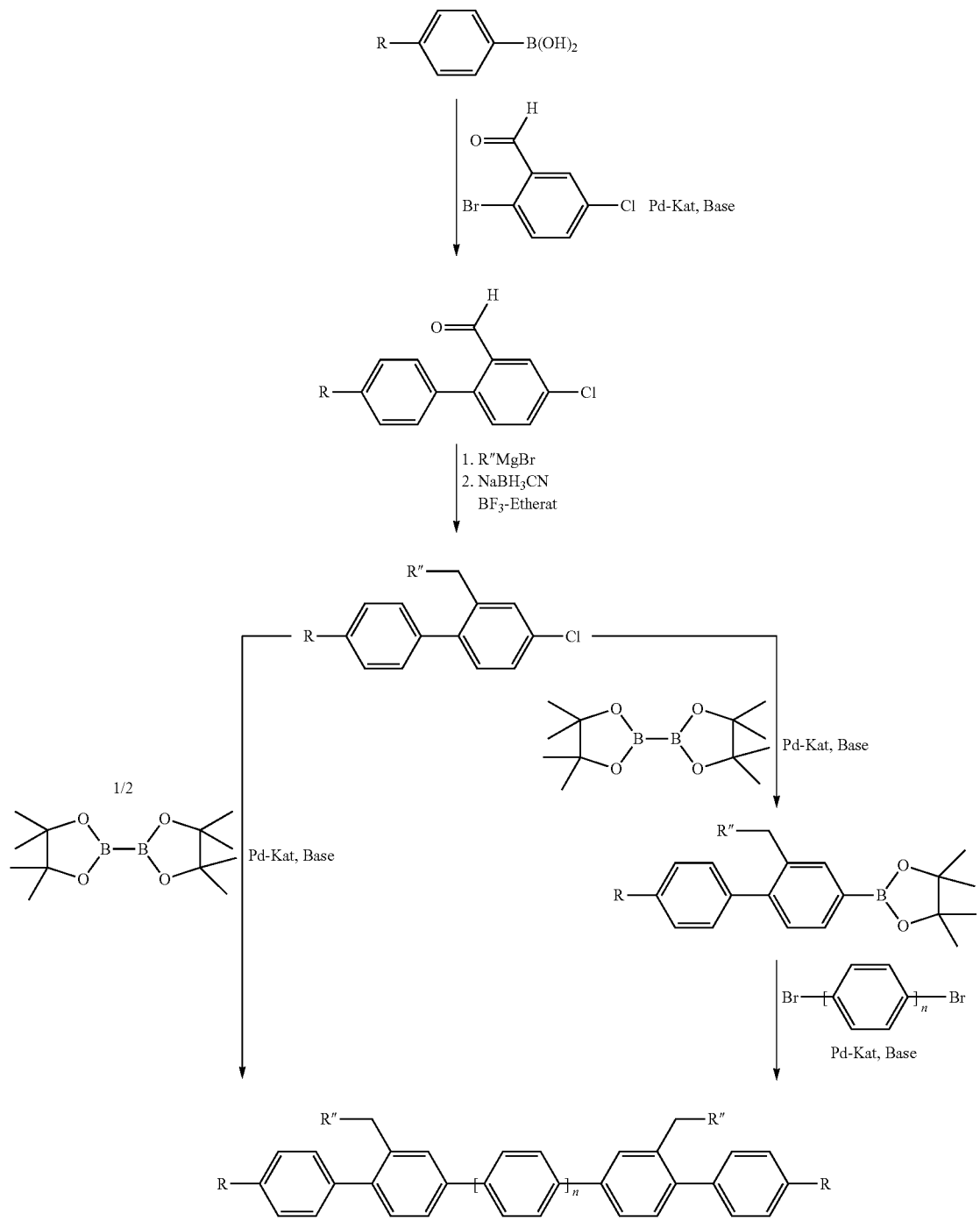

wherein

R independently of each other have the meaning given for $R^{51}$ under formula V above and are preferably alkyl, n is 2 and optionally 3, preferably 2 and R″ independently of each other have the meaning given for $L^{51}$ under formula V above and are preferably are alkyl with 1 to 11, more preferably with 1 to 7 and particularly preferred with 2 to 5 C atoms.

Scheme 15. Fourth exemplary synthesis of compounds of formula V

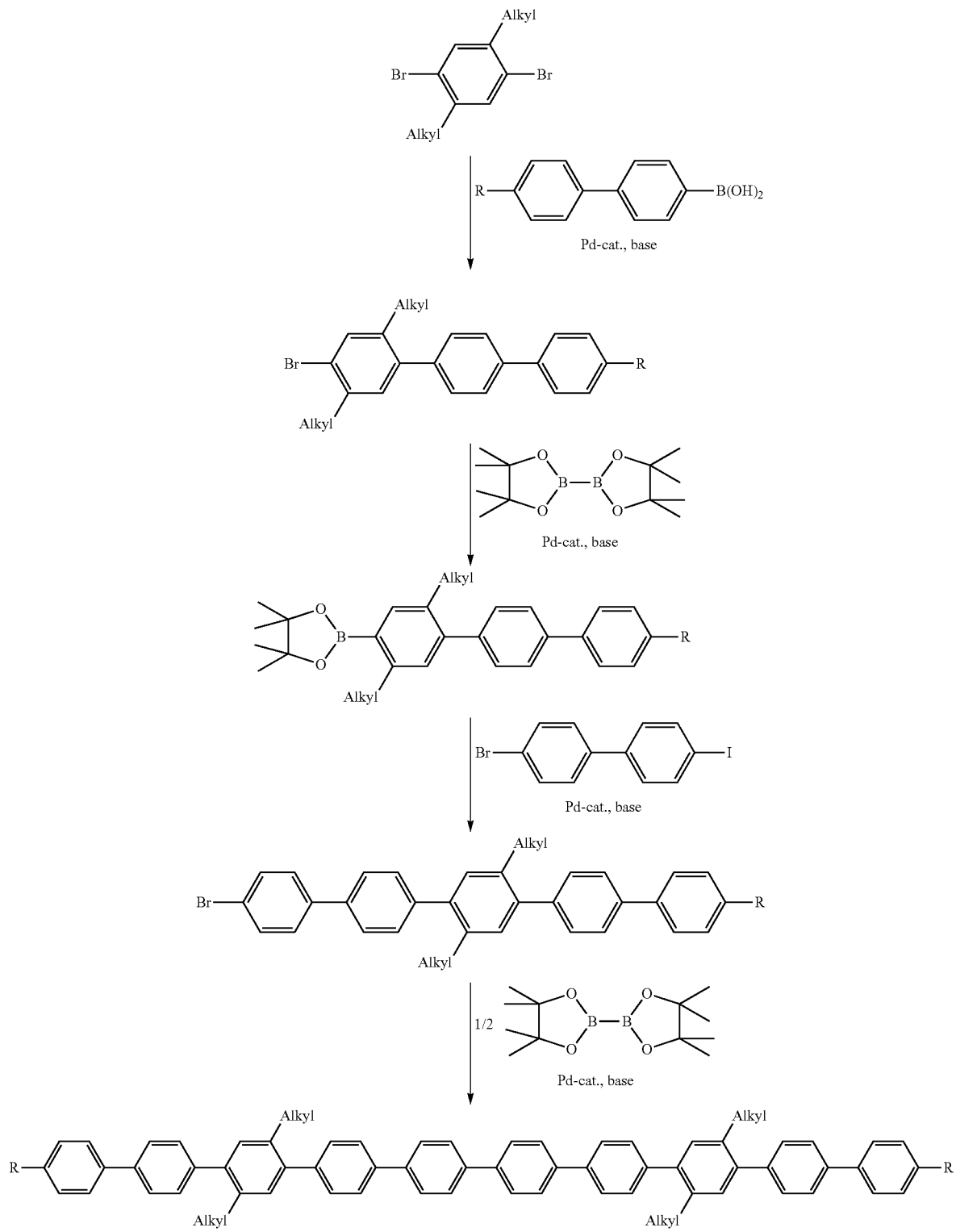

wherein

R independently of each other have the meaning given for $R^{51}$ under formula V above and are preferably alkyl, most preferably with 1 to 15 C atoms and "Alkyl" is alkyl with 1 to 15 C atoms, preferably with 3 to 12 C atoms.

The compounds of formulae VI-1 and VI-2 may be prepared advantageously according to the following reaction scheme (Scheme 16).

Scheme 16. Exemplary synthesis of compounds of formulae VI-1 and VI-2

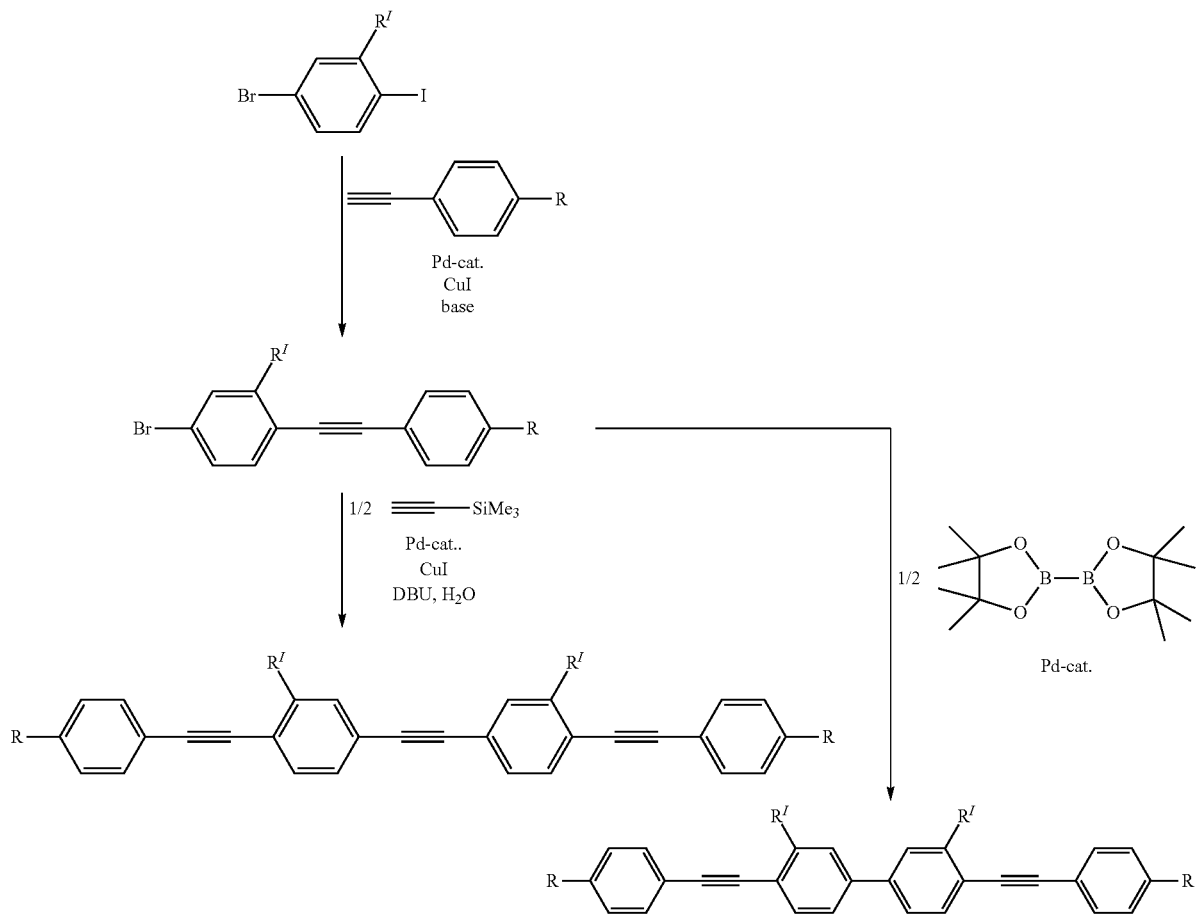

wherein
R independently of each other have the meaning given for $R^{61}$ under formula VI above and are preferably alkyl and
$R^I$ independently of each other have the meaning given for $R^{63}$ under formula VI above.

Other mesogenic compounds, which are not explicitly mentioned above, can optionally and advantageously also be used in the media in accordance with the present invention. Such compounds are known to the person skilled in the art.

The compounds of formulae I to V can be synthesized according to or in analogy to methods which are known per se and which are described in standard works of organic chemistry such as, for example, Houben-Weyl, Methoden der organischen Chemie, Thieme-Verlag, Stuttgart.

The liquid crystal media according to the invention consist of a plurality of compounds, preferably 3 to 15, more preferably 3 to 10 and very preferably 3 to 5 compounds. These compounds are mixed in a conventional manner. In general, the desired amount of the compound used in the smaller amount is dissolved in the compound used in the larger amount. If the temperature is above the clearing point of the compound used in the higher concentration, it is particularly easy to observe completion of the dissolution process. It is, however, also possible to prepare the media in other conventional ways, for example using so-called premixes, which can be, for example, homologous or eutectic mixtures of compounds, or using so-called "multibottle" systems, the constituents of which are themselves ready-to-use mixtures.

In a preferred embodiment of the present invention, the liquid crystal media comprise three or more compounds of formula I and one or more compounds of formula II.

In a more preferred embodiment of the present invention, the liquid crystal media comprise three or more compounds of formula I and one or more compounds of formula III.

In an even more preferred embodiment, the liquid crystal media comprise three or more compounds of formula I and one or more compounds of formula IV.

In an especially preferred embodiment, the liquid crystal media comprise three or more compounds of formula I and one or more compounds of formula V.

In an especially preferred embodiment, the liquid crystal media comprise three or more compounds of formula I and one or more compounds of formula VI.

In particular, preference is given to the liquid crystal media, which comprise
three or more compounds of formula I and
one or more compounds of formula III or
one or more compounds of formula IV or
one or more compounds of formula V or
one or more compounds of formula VI and
optionally, preferably obligatorily one or more compounds of formula II.

The liquid crystal media of the present invention preferably comprise
one, two, three or more compounds of formula I and
one or more compounds of formula III and one or more compounds of formula IV or one or more compounds of formula III and one or more compounds of formula V or one or more compounds of formula III and one or more compounds of formula VI or one or more compounds of formula IV and one or more compounds of formula V or one or more compounds of formula IV and one or more compounds of formula VI or one or more compounds of formula V and one or more compounds of formula VI and optionally, preferably obligatorily, one or more compounds of formula II.

The liquid crystal media of the present invention preferably comprise one, two, three or more compounds of formula I and one or more compounds of formula III and one or more compounds of formula IV and one or more compounds of formula V or one or more compounds of formula III and one or more compounds of formula IV and one or more compounds of formula VI or one or more compounds of formula III and one or more compounds of formula V and one or more compounds of formula VI or one or more compounds of formula IV and one or more compounds of formula V and one or more compounds of formula VI and optionally, preferably obligatorily, one or more compounds of formula II.

The liquid crystal media of the present invention preferably comprise compounds of formula I in a total concentration in the range from 25% or more to 95% or less, more preferably in the range from 35% or more to 90% or less, more preferably in the range from 45% or more to 85% or less, more preferably in the range from 55% or more to 80% or less and most preferably in the range from 60% or more to 75% or less.

The liquid crystal media of the present invention preferably consist predominantly exclusively of compounds selected from the group of the compounds of formulae I, II, III, IV, V and VI.

In a preferred embodiment of the present invention, in which the liquid crystal media comprise in each case one or more compounds of the formulae I and II to V, the concentration of the compounds of formula I is preferably 90 to 95%, the concentration of the compounds of formula II to V is preferably 0 to 10%, more preferably 2 to 10% and particularly preferably 5 to 10%.

Further preferred are liquid crystal media comprising, 40 to 85%, preferably 45 to 80% of compounds of formula I, 5 to 35%, preferably 10 to 30% of compounds selected from the group of formulae III, IV, V and VI and 5 to 40%, preferably 10 to 30% of compounds of formula II.

Especially preferably, the liquid crystal media according to the present invention consist exclusively of the above-mentioned compounds.

In this application, "comprise" in connection with compositions means that the entity in question, i.e. the medium comprises the compound or compounds indicated, preferably in a total concentration of 3% or more and very preferably 5% or more. Additionally, "consists exclusively" means that the entity in question comprises preferably 99% or more and very preferably 100.0% of the compound or compounds indicated.

The liquid-crystalline media according to the present invention may contain further additives, like dyes, antioxidants, chiral dopants, UV stabilizers, in usual concentrations. The total concentration of these further constituents is in the range of 10 ppm to 10%, preferably 100 ppm to 6%, based on the total mixture. The concentrations of the individual compounds used each are preferably in the range of 0.1% to 3%.

The liquid crystal media in accordance with the present invention preferably have a clearing point of 140° C. or more, more preferably 150° C. or more, still more preferably 160° C. or more, particularly preferably 170° C. or more and very particularly preferably 180° C. or more.

The liquid crystal media according to the invention preferably have nematic phases of in each case at least from −20° C. to 140° C., preferably from −30° C. to 150° C. and very particularly preferably from −40° C. to 160° C. The phase particularly preferably extends to 170° C. or more, preferably to 180° C. or more. The expression have a nematic phase here means on the one hand that no smectic phase and no crystallisation are observed at low temperatures at the corresponding temperature and on the other hand that no clearing occurs on heating from the nematic phase. Components having a nematic phase at the measurement temperature of 20° C. are measured as such; all others are treated like compounds. The investigation at low temperatures is carried out in a flow viscometer at the corresponding temperature and checked by storage in test cells having a layer thickness of 5 µm for at least 100 hours. At high temperatures, the clearing point is determined in capillaries by conventional methods.

The $\Delta\epsilon$ of the liquid crystal media in accordance with the invention, at 1 kHz and 20° C., are preferably 1 or more, more preferably 2 or more and very preferably 3 or more.

In the present application, the expression dielectrically positive describes compounds or components where $\Delta\epsilon > 3.0$, dielectrically neutral describes those where $-1.5 \leq \Delta\epsilon \leq 3.0$ and dielectrically negative describes those where $\Delta\epsilon < -1.5$. $\Delta\epsilon$ is determined at a frequency of 1 kHz and at 20° C. The dielectric anisotropy of the respective compound is determined from the results of a solution of 10% of the respective individual compound in a nematic host mixture. If the solubility of the respective compound in the host mixture is less than 10%, the concentration is reduced to 5%. The capacitances of the test mixtures are determined both in a cell having homeotropic alignment and in a cell having homogeneous alignment. The cell thickness of both types of cells is approximately 20 µm. The voltage applied is a rectangular wave having a frequency of 1 kHz and an effective value of typically 0.5 V to 1.0 V, but it is always selected to be below the capacitive threshold of the respective test mixture.

$\Delta\epsilon$ is defined as $(\epsilon_{\|} - \epsilon_{\perp})$, while $\epsilon_{ave.}$ is $(\epsilon_{\|} + 2\epsilon_{\perp})/3$.

The host mixture used for dielectrically positive compounds is mixture ZLI-4792 and that used for dielectrically neutral and dielectrically negative compounds is mixture ZLI-3086, both from Merck KGaA, Germany. The absolute values of the dielectric constants of the compounds are determined from the change in the respective values of the host mixture on addition of the compounds of interest. The values are extrapolated to a concentration of the compounds of interest of 100%.

The $\Delta n$ of the liquid crystal media in accordance with the present invention, at 589 nm ($Na^D$) and 20° C., is preferably in the range from 0.340 or more to 0.90 or less, more preferably in the range from 0.350 or more to 0.90 or less, even more preferably in the range from 0.400 or more to 0.85 or less and very particularly preferably in the range from 0.450 or more to 0.800 or less.

The liquid crystal media are investigated with respect to their properties in the microwave frequency range as described in A. Penirschke, S. Müller, P. Scheele, C. Weil, M. Wittek, C. Hock and R. Jakoby: "Cavity Perturbation Method for Characterization of Liquid Crystals up to 35 GHz", 34$^{th}$ European Microwave Conference—Amsterdam, pp. 545-548.

Compare in this respect also A. Gaebler, F. Gölden, S. Müller, A. Penirschke and R. Jakoby "Direct Simulation of Material Permittivites . . . ", 12MTC 2009—International Instrumentation and Measurement Technology Conference, Singapore, 2009 (IEEE), pp. 463-467, and DE 10 2004 029 429 A, in which a measurement method is likewise described in detail.

The liquid crystal is introduced into a polytetrafluoroethylene (PTFE) or fused silica capillary. The capillary has an internal radius of 180 μm and an external radius of 350 μm. The effective length is 2.0 cm. The filled capillary is introduced into the centre of the cavity with a resonance frequency of 30 GHz. This cavity has a length of 6.6 mm, a width of 7.1 mm and a height of 3.6 mm. The input signal (source) is then applied, and the result of the output signal is recorded using a commercial vector network analyser. For other frequencies (e.g. 19 GHz), the dimensions of the cavity can be adjusted accordingly.

The change in the resonance frequency and the Q factor between the measurement with the capillary filled with the liquid crystal and the measurement without the capillary filled with the liquid crystal is used to determine the dielectric constant and the loss angle at the corresponding target frequency by means of equations 10 and 11 in A. Penirschke, S. Müller, P. Scheele, C. Weil, M. Wittek, C. Hock and R. Jakoby: "Cavity Perturbation Method for Characterization of Liquid Crystals up to 35 GHz", 34$^{th}$ European Microwave Conference—Amsterdam, pp. 545-548, as described therein.

The values for the components of the properties perpendicular and parallel to the director of the liquid crystal are obtained by alignment of the liquid crystal in a magnetic field. To this end, the magnetic field of a permanent magnet is used. The strength of the magnetic field is 0.35 tesla. The alignment of the magnets is set correspondingly and then rotated correspondingly through 90°.

The material quality $\eta=\tau/\tan \delta\perp$ of the preferred liquid crystal materials is 5 or more, preferably 6 or more, preferably 8 or more, preferably 10 or more, preferably 15 or more, preferably 17 or more, particularly preferably 20 or more and very particularly preferably 25 or more.

The liquid crystalline media according to the present invention are very well suited for the preparation of microwave components, such as tunable phase shifters. These may be tuned by the application of magnetic and/or electric fields. Tuning by electric fields is generally preferred. These phase shifters are operable in the UHF-band (0.3-1 GHz), L-band (1-2 GHz), S-band (2-4 GHz), C-band (4-8 GHz), X-band (8-12 GHz), Ku-band (12-18 GHz), K-band (18-27 GHz), Ka-band (27-40 GHz), V-band (50-75 GHz), W-band (75-110 GHz) and up to 1 THz.

Preferable frequencies for operation are C-band, X-band, Ku-band, K-band, Ka-band, V-band, W-band, and up to 1 THz. Particularly preferable frequencies for operation are Ku-band, K-band, Ka-band, V-band, W-band, and up to 1 THz.

The preferred liquid crystal materials have phase shifter qualities of 15°/dB or more, preferably 20°/dB or more, preferably 30°/dB or more, preferably 40°/dB or more, preferably 50°/dB or more, particularly preferably 80°/dB or more and very particularly preferably 100°/dB or more.

The construction of the phase shifters according to the present application is known to the expert. Typically loaded line phase shifters, "inverted microstrip lines" (short IMSL), Finline phase shifters, preferably Antipodal Finline phase shifters, slotline phase shifters, microstrip line phase shifters or coplanar waveguides (CPW) phase shifters are used. These components allow the realization of reconfigurable antenna arrays, which are fully electrically reconfigurable and which allow to steer the main beam direction of the antennas, to blank out interferers and/or to achieve high directivity. Another preferred embodiment is waveguide partially filled with the liquid crystals according to the present invention, as described in WO 2011/036243 A1, which is encompassed herein by reference herewith.

In a preferred embodiment the inventive phase shifters are combined into array antennas, preferably into phased array antennas, reflectarray antennas, and arrays consisting of Vivaldi antennas.

Especially preferred applications for the tunable antenna arrays according to the present application are satellite communication systems, for operation e.g. between satellites, from satellites to ground stations, from mobile ground stations via satellite to stationary ground stations or to other mobile ground stations, e.g. for receiving and sending communication, television or video to vehicles like ships, planes, trains and cars. Other preferred applications are short-distance antennas of the wireless routers to the laptop PCs, tablet computers and mobile devices.

In the present application, the term "compounds" is taken to mean both one compound and a plurality of compounds, unless expressly stated otherwise.

For an overview of terms and definitions in connection with liquid crystals and mesogens see Pure Appl. Chem. 73(5), 888 (2001) and C. Tschierske, G. PelzI and S. Diele, Angew. Chem. 2004, 116, 6340-6368.

The term "mesogenic group" means a group with the ability to induce liquid crystal (LC) phase behaviour. The compounds comprising mesogenic groups do not necessarily have to exhibit an LC phase themselves. It is also possible that they show LC phase behaviour only in mixtures with other compounds (e.g. liquid crystal host mixtures), or when the mesogenic compounds or the mixtures thereof are polymerised. For the sake of simplicity, the term "liquid crystal" is used hereinafter for both mesogenic and LC materials.

The liquid crystals employed are either individual substances or mixtures. They preferably have a nematic phase.

The parameter ranges indicated in this application all include the limit values, unless expressly stated otherwise.

The different upper and lower limit values indicated for various ranges of properties in combination with one another give rise to additional preferred ranges.

Throughout this application, the following conditions and definitions apply, unless expressly stated otherwise. All concentrations are quoted in percent by weight and relate to the respective mixture as a whole, all temperatures are quoted in degrees Celsius and all temperature differences are quoted in differential degrees. All physical properties are determined in accordance with "Merck Liquid Crystals, Physical Properties of Liquid Crystals", Status November 1997, Merck KGaA, Germany, and are quoted for a temperature of 20° C., unless expressly stated otherwise. The optical anisotropy ($\Delta n$) is determined at a wavelength of 589.3 nm. The dielectric anisotropy ($\Delta\epsilon$) is determined at a frequency of 1 kHz or if explicitly stated at a frequency 19 GHz. The threshold voltages, as well as all other electro-optical properties, are determined using test cells produced at Merck KGaA, Germany. The test cells for the determination of Δ∈ have a cell thickness of approximately 20 μm. The electrode is a circular ITO electrode having an area of 1.13 cm² and a guard ring. The orientation layers are SE-1211 from Nissan Chemicals, Japan, for homeotropic orientation (∈∥) and polyimide AL-1054 from Japan Synthetic Rubber, Japan, for homogeneous orientation (∈⊥). The capacitances are determined using a Solatron 1260 frequency response analyser using a sine wave with a voltage of 0.3 $V_{rms}$. The light used in the electro-optical measurements is white light. A set-up using a commercially available DMS instrument from Autronic-Melchers, Germany, is used here.

The term "alkyl" preferably encompasses straight chain and branched alkyl groups having 1 to 15 carbon atoms, in particular the straight chain groups methyl, ethyl, propyl, butyl, pentyl, hexyl and heptyl. Groups having 2 to 10 carbon atoms are generally preferred.

The term "alkenyl" preferably encompasses straight chain and branched alkenyl groups having 2 to 15 carbon atoms, in particular the straight-chain groups. Particularly preferred alkenyl groups are $C_2$- to $C_7$-1E-alkenyl, $C_4$- to $C_7$-3E-alkenyl, $C_5$- to $C_7$-4-alkenyl, $C_6$- to $C_7$-5-alkenyl and $C_7$-6-alkenyl, in particular $C_2$- to $C_7$-1E-alkenyl, $C_4$- to $C_7$-3E-alkenyl and $C_5$- to $C_7$-4-alkenyl. Examples of further preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably encompasses straight-chain groups having terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" or "alkoxyalkyl" preferably encompasses straight-chain radicals of formula $C_nH_{2n+1}$—O—$(CH_2)_m$, in which n and m each, independently of one another, denote 1 to 10. Preferably, n is 1 and m is 1 to 6.

Compounds containing a vinyl end group and compounds containing a methyl end group have low rotational viscosity.

The liquid crystal media in accordance with the present invention may comprise further additives and chiral dopants in the usual concentrations. The total concentration of these further constituents is in the range from 0% to 10%, preferably 0.1% to 6%, based on the mixture as a whole. The concentrations of the individual compounds used are each preferably in the range from 0.1% to 3%. The concentration of these and similar additives is not taken into consideration when quoting the values and concentration ranges of the liquid crystal components and liquid crystal compounds of the liquid crystal media in this application.

All temperatures, such as, for example, the melting point T(C,N) or T(C,S), the transition from the smectic (S) to the nematic (N) phase T(S,N) and the clearing point T(N,I) of the liquid crystals, are quoted in degrees Celsius. All temperature differences are quoted in differential degrees.

In the present invention and especially in the following examples, the structures of the mesogenic compounds are indicated by means of abbreviations also referred to as acronyms. In these acronyms, the chemical formulae are abbreviated as follows using Tables A to C below. All groups $C_nH_{2n+1}$, $C_mH_{2m+1}$ and $C_lH_{2l+1}$ or $C_nH_{2n-1}$, $C_mH_{2m-1}$ and $C_lH_{2l-1}$ denote straight-chain alkyl or alkenyl, preferably 1-E-alkenyl, respectively, in each case having n, m or l C atoms. Table A lists the codes used for the ring elements of the core structures of the compounds, while Table B shows the linking groups. Table C gives the meanings of the codes for the lefthand or right-hand end groups. Table D shows illustrative structures of compounds with their respective abbreviations.

TABLE A

Ring elements

C, D, DI, A, AI, P, P(n), PI(n), P(c), PI(c), G, GI, G(n), GI(n), U, UI, U(n), UI(n)

TABLE A-continued

Ring elements

| | | | |
|---|---|---|---|
| Y | 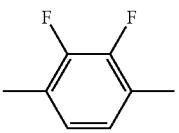 | | |
| M | 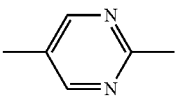 | MI | 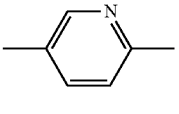 |
| N | 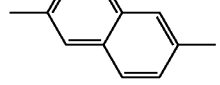 | NI | 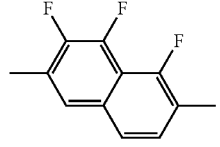 |
| Np | 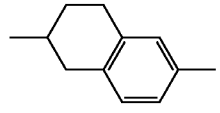 | | |
| N3f | 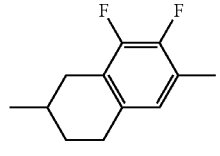 | N3fI | 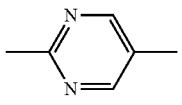 |
| tH | 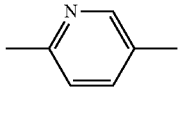 | tHI | 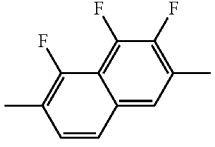 |
| tH2f | 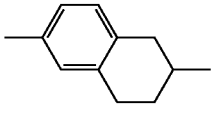 | tH2fI | 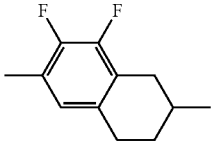 |
| dH | 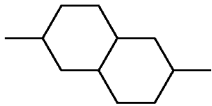 | | |
| K | 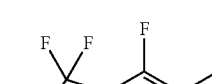 | KI | 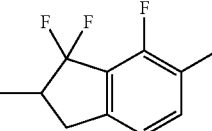 |
| L | 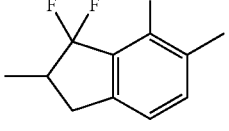 | LI | 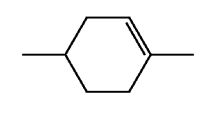 |
| F | 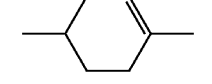 | FI | 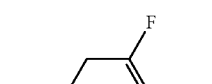 |

TABLE B

Linking groups

| | | | |
|---|---|---|---|
| E | —CH$_2$CH$_2$— | Z | —CO—O— |
| V | —CH=CH— | ZI | —O—CO— |
| X | —CF=CH— | O | —CH$_2$—O— |
| XI | —CH=CF— | OI | —O—CH$_2$— |
| B | —CF=CF— | Q | —CF$_2$—O— |
| T | —C≡C— | QI | —O—CF$_2$— |
| W | —CF$_2$CF$_2$— | | |

TABLE C

End groups

| Left-hand side | | Right-hand side | |
|---|---|---|---|
| Use alone | | | |
| -n- | C$_n$H$_{2n+1}$— | -n | —C$_n$H$_{2n+1}$ |
| -nO- | C$_n$H$_{2n+1}$—O— | -nO | —O—C$_n$H$_{2n+1}$ |
| -V- | CH$_2$=CH— | -V | —CH=CH$_2$ |
| -nV- | C$_n$H$_{2n+1}$—CH=CH— | -nV | —C$_n$H$_{2n}$—CH=CH$_2$ |
| -Vn- | CH$_2$=CH—C$_n$H$_{2n+1}$— | -Vn | —CH=CH—C$_n$H$_{2n+1}$ |
| -nVm- | C$_n$H$_{2n+1}$—CH=CH—C$_m$H$_{2m}$— | -nVm | —C$_n$H$_{2n}$—CH=CH—C$_m$H$_{2m+1}$ |
| -N- | N≡C— | -N | —C≡N |
| -S- | S=C=N— | -S | —N=C=S |
| -F- | F— | -F | —F |
| -CL- | Cl— | -CL | —Cl |
| -M- | CFH$_2$— | -M | —CFH$_2$ |
| -D- | CF$_2$H— | -D | —CF$_2$H |
| -T- | CF$_3$— | -T | —CF$_3$ |
| -MO- | CFH$_2$O— | -OM | —OCFH$_2$ |
| -DO- | CF$_2$HO— | -OD | —OCF$_2$H |
| -TO- | CF$_3$O— | -OT | —OCF$_3$ |
| -OXF- | CF$_2$=CH—O— | -OXF | —O—CH=CF$_2$ |
| -A- | H—C≡C— | -A | —C≡C—H |
| -nA- | C$_n$H$_{2n+1}$—C≡C— | -An | —C≡C—C$_n$H$_{2n+1}$ |
| -NA- | N≡C—C≡C— | -AN | —C≡C—C≡N |

TABLE C-continued

| End groups | | | |
|---|---|---|---|
| Left-hand side | | Right-hand side | |
| Use together with others | | | |
| -...A...- | —C≡C— | -...A... | —C≡C— |
| -...V...- | CH=CH— | -...V... | —CH=CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF=CF— | -...W... | —CF=CF— | wherein n and m each denote integers, and the three dots "..." are placeholders for other abbreviations from this table.

The following table shows illustrative structures together with their respective abbreviations. These are shown in order to illustrate the meaning of the rules for the abbreviations. They furthermore represent compounds, which are preferably used.

TABLE D

Illustrative structures

Compounds representing formula I

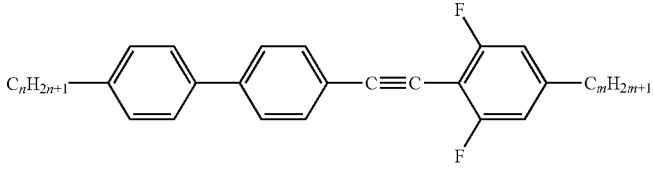

PPTUI-n-m

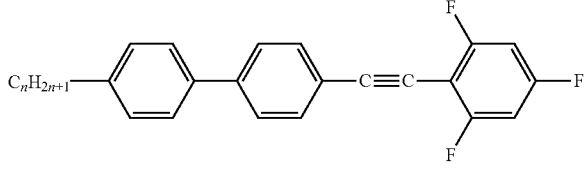

PPTUI-n-F

Compounds representing formula II

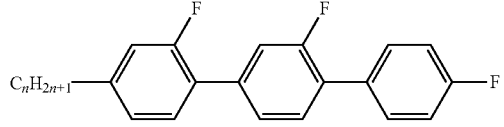

GGP-n-F

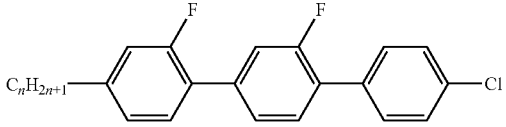

GGP-n-CL

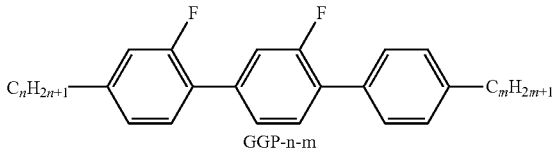

GGP-n-m

TABLE D-continued
Illustrative structures
Compounds representing formula III
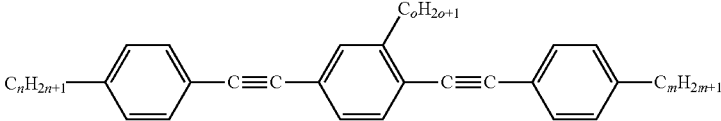
PTP(o)TP-n-m
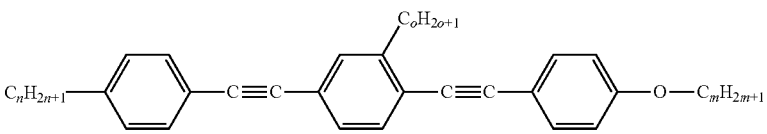
PTP(o)TP-n-Om
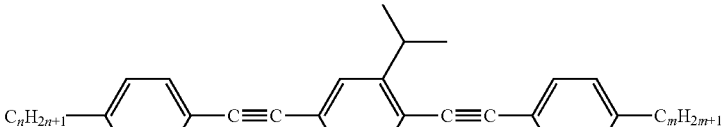
PTP(i3)TP-n-m
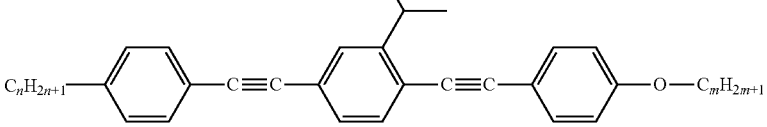
PTP(i3)TP-n-Om
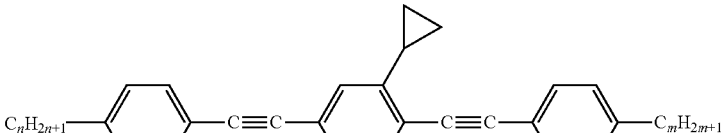
PTP(c3)TP-n-m
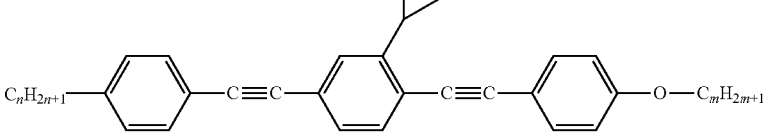
PTP(c3)TP-n-Om
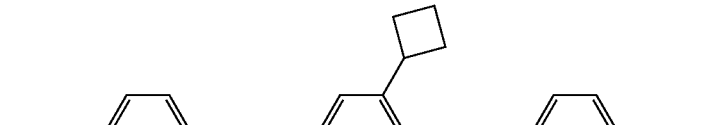
PTP(c4)TP-n-m TABLE D-continued
Illustrative structures
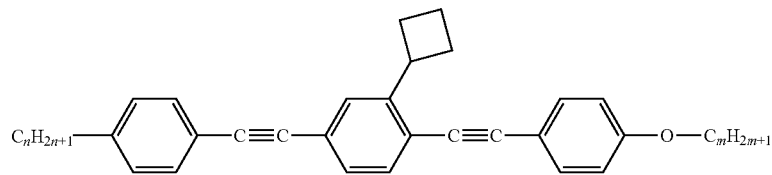
PTP(c4)TP-n-Om
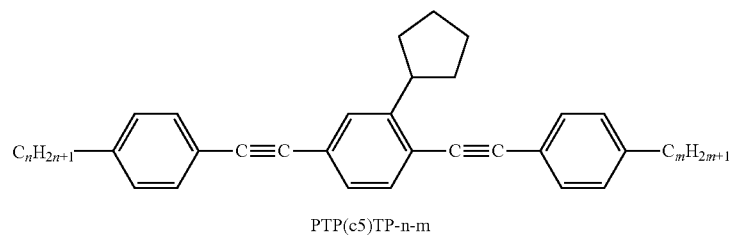
PTP(c5)TP-n-m
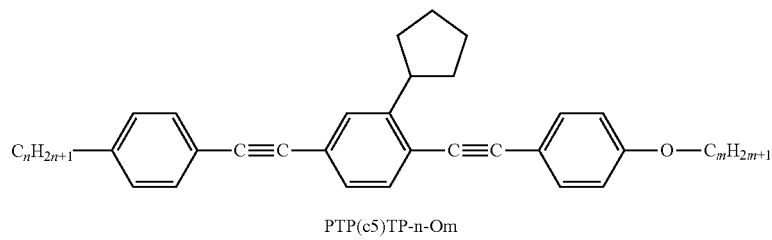
PTP(c5)TP-n-Om
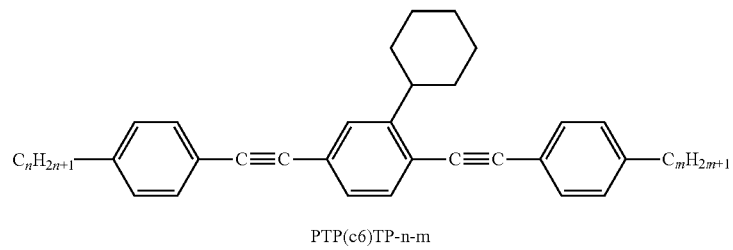
PTP(c6)TP-n-m
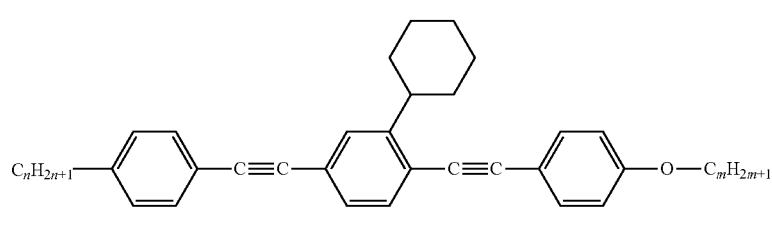
PTP(c6)TP-n-Om
Compounds representing formula IV
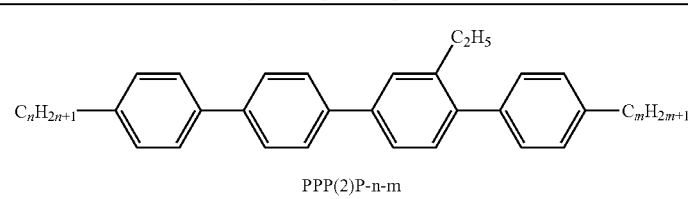
PPP(2)P-n-m
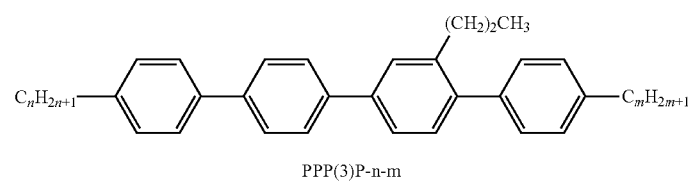
PPP(3)P-n-m TABLE D-continued
Illustrative structures
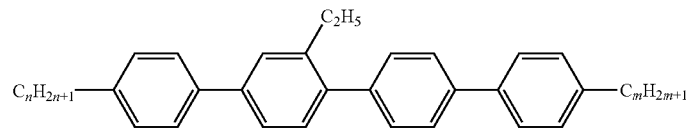
PP(2)PP-n-m
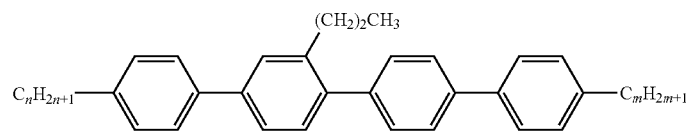
PP(3)PP-n-m
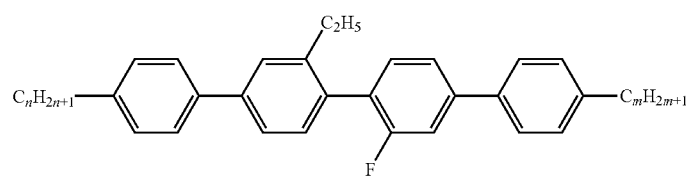
PP(2)GIP-n-m
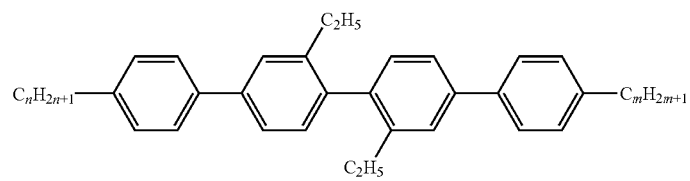
PP(2)PI(2)P-n-m
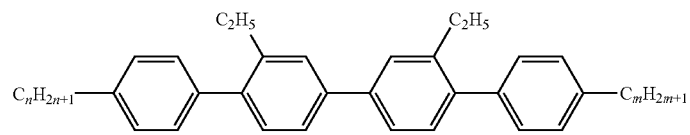
PP(2)PI(2)P-n-m
Compounds representing formula VI
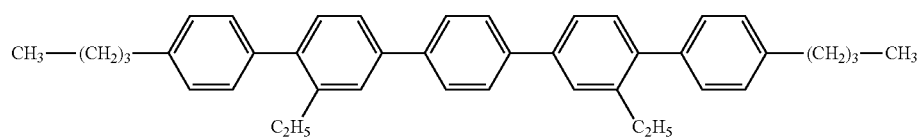
PPI(2)PP(2)P-4-4
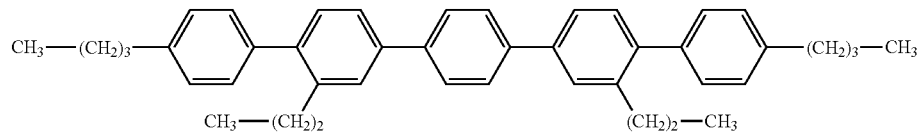
PPI(3)PP(3)P-4-4
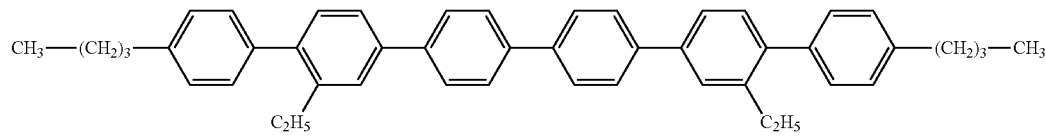
PPI(2)PPP(2)P-4-4

TABLE D-continued
Illustrative structures
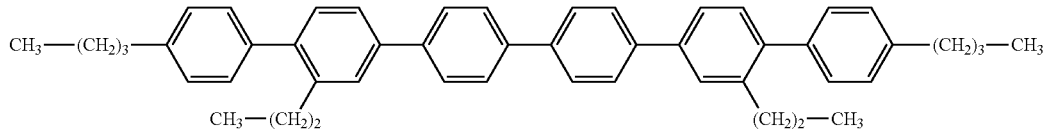
PPI(3)PPP(3)P-4-4
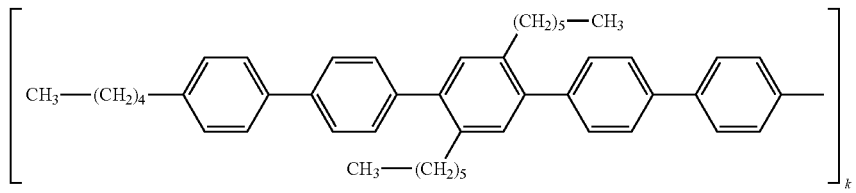
PPPI(6)PPPPP(6)PP-5-5 (= P$_2$PI(6)P$_2$P(6)P$_2$-5-5), k = 2
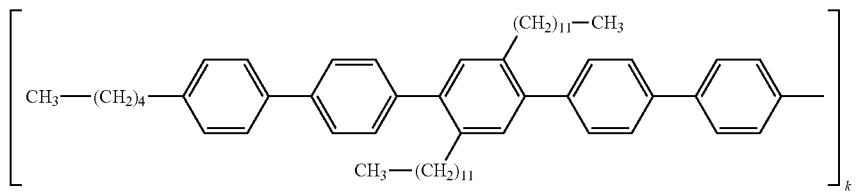
PPPI(12)PPPPP(12)PP-5-5 (= P$_2$PI(12)P$_2$P(12)P$_2$-5-5), k = 2
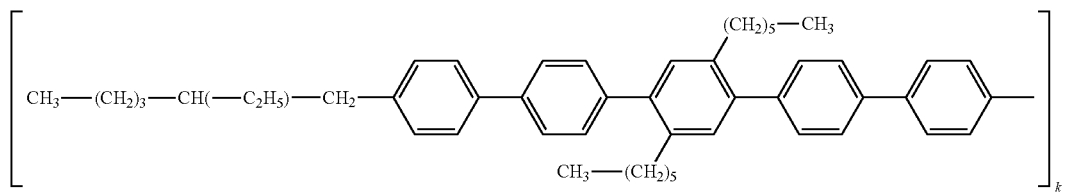
PPPI(6)PPPPP(6)PP-i8-i8 (= P$_2$PI(6)P$_2$P(6)P$_2$-i8-i8), k = 2
Further possible constituents of the liquid crystaline media
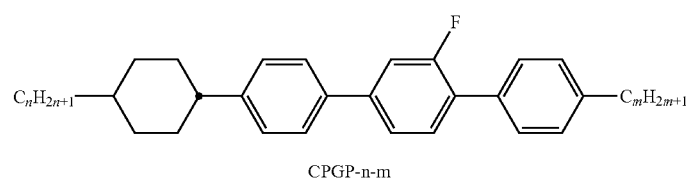
CPGP-n-m
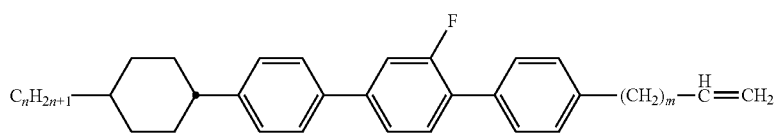
CPGP-n-mV
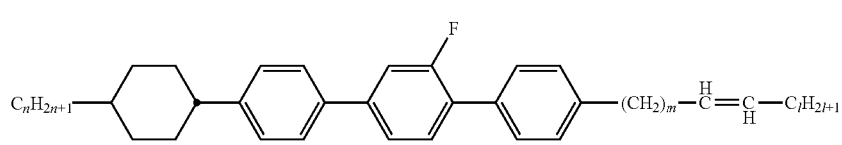
CPGP-n-mVI

TABLE D-continued

Illustrative structures

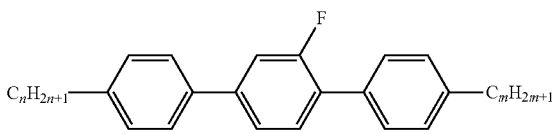

PGP-n-m

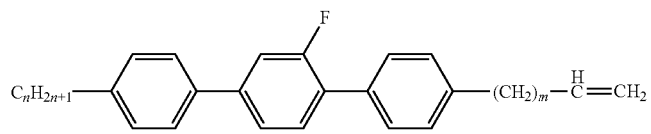

PGP-n-mV

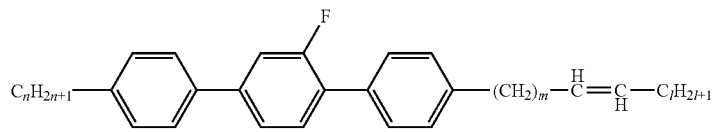

PGP-n-mVI

EXAMPLES

The following examples illustrate the present invention without limiting it in any way.

However, it is clear to the person skilled in the art from the physical properties what range of properties is achievable and over which ranges they may be modified. In particular, the combination of the various properties that is achievable preferably is thus well defined for the person skilled in the art.

Comparative Example 1

A liquid crystal mixture C-1 having the composition and properties as indicated in the following table is prepared and investigated.

| Composition Compound | | |
|---|---|---|
| No. | Abbreviation | |
| 1 | PPTUI-3-4 | 25.1 |
| 2 | PPTUI-4-4 | 48.5 |
| 3 | PPTUI-3-2 | 26.4 |
| Σ | | 100.0 |
| Physical properties | | |
| T(N, I) = | | 163.5° C. |
| $n_e$ (20° C., 589.3 nm) = | | 1.8729 |
| Δn (20° C., 589.3 nm) = | | 0.3984 |
| $\epsilon_\parallel$ (20° C., 1 kHz) = | | 3.8 |
| Δε (20° C., 1 kHz) = | | 1.0 |
| $\gamma_1$ (20° C.) = | | 310 mPa · s |
| $k_1$ (20° C.) = | | 17.3 pN |
| $k_1/k_3$ (20° C.) = | | 2.20 |
| $V_0$ (20° C., 1 kHz) = | | 4.04 V |

TABLE 1

| Properties of mixture C-1 at 30 GHz | | | | |
|---|---|---|---|---|
| T/° C. | $\epsilon_{r,\parallel}$ | $\epsilon_{r,\perp}$ | tan $\delta_{\epsilon_r,\parallel}$ | tan $\delta_{\epsilon,r,\perp}$ |
| 20 | 3.2 | 2.4 | 0.0070 | 0.0150 |

This mixture is only moderately well suited for applications in the microwave range.

Example 1

A liquid crystal mixture M-1 having the composition and properties as indicated in the following table is prepared and investigated.

| Composition Compound | | |
|---|---|---|
| # | Abbreviation | |
| 1 | PPTUI-3-2 | 25.0 |
| 2 | PPTUI-3-4 | 25.0 |
| 3 | PPTUI-4-4 | 25.0 |
| 4 | PTP(2)TP-6-3 | 25.0 |
| Σ | | 100.0 |
| Physical properties | | |
| T(N, I) = | | 154° C. |
| $n_e$ (20° C., 589.3 nm) = | | t.b.d. |
| Δn (20° C., 589.3 nm) = | | t.b.d. |
| $\epsilon_\parallel$ (20° C., 1 kHz) = | | 3.7 |
| Δε (20° C., 1 kHz) = | | 0.8 |
| $\gamma_1$ (20° C.) = | | 718 mPa · s |
| $k_1$ (20° C.) = | | 17.4 pN |
| $k_1/k_3$ (20° C.) = | | 1.54 |
| $V_0$ (20° C., 1 kHz) = | | 2.05 V |

Remarks: t.b.d.: to be determined.

TABLE 2

Properties of mixture M-1 at 30 GHz

| T/° C. | $\epsilon_{r,\parallel}$ | $\epsilon_{r,\perp}$ | tan $\delta_{\epsilon,r,\parallel}$ | tan $\delta_{\epsilon,r,\perp}$ |
|---|---|---|---|---|
| 20 | 3.2 | 2.4 | 0.0057 | 0.0128 |

This mixture is highly suitable for applications in the microwave range due to its lower value for tan $\delta_{\epsilon,r,\perp}$, in particular for phase shifters.

Comparative Example 2

A liquid crystal mixture C-2 having the composition and properties as indicated in the following table is prepared and investigated.

Composition Compound

| No. | Abbreviation | |
|---|---|---|
| 1 | PPTUI-3-2 | 20.0 |
| 2 | PPTUI-3-4 | 20.0 |
| 3 | PTP-2-O1 | 10.0 |
| 4 | PTP-3-O1 | 10.0 |
| 5 | GGP-3-Cl | 10.0 |
| 6 | GGP-5-Cl | 20.0 |
| 7 | PGP-2-3 | 10.0 |
| Σ | | 100.0 |

Physical properties

| | |
|---|---|
| T(N, I) = | 120° C. |
| $n_e$ (20° C., 589.3 nm) = | t.b.d. |
| Δn (20° C., 589.3 nm) = | t.b.d. |
| $\epsilon_{\parallel}$ (20° C., 1 kHz) = | 7.6 |
| Δε (20° C., 1 kHz) = | 3.9 |
| $\gamma_1$ (20° C.) = | t.b.d. mPa · s |
| $k_1$ (20° C.) = | 13.8 pN |
| $k_1/k_3$ (20° C.) = | 1.7 |
| $V_0$ (20° C., 1 kHz) = | 1.99 V |

Remarks: t.b.d.: to be determined.

TABLE 3

Properties of mixture C-2 at 30 GHz

| T/° C. | $\epsilon_{r,\parallel}$ | $\epsilon_{r,\perp}$ | tan $\delta_{\epsilon,r,\parallel}$ | tan $\delta_{\epsilon,r,\perp}$ |
|---|---|---|---|---|
| 20 | 3.2 | 2.5 | 0.0060 | 0.0190 |

This mixture is moderately well suited for applications in the microwave range, in particular for phase shifters.

Example 2

A liquid crystal mixture M-2 having the composition and properties as indicated in the following table is prepared and investigated.

Composition Compound

| # | Abbreviation | |
|---|---|---|
| 1 | GGP-4-Cl | 8.0 |
| 2 | GGP-5-Cl | 22.0 |
| 3 | PPTUI-3-2 | 23.0 |
| 4 | PPTUI-3-5 | 22.0 |
| 5 | PPTUI-4-4 | 16.0 |
| 6 | PTP(2)ITP(2)P-4-4 | 19.0 |
| Σ | | 100.0 |

Physical properties

| | |
|---|---|
| T(N, I) = | 152° C. |
| $n_e$ (20° C., 589.3 nm) = | t.b.d. |
| Δn (20° C., 589.3 nm) = | t.b.d. |
| $\epsilon_{\parallel}$ (20° C., 1 kHz) = | 7.7 |
| Δε (20° C., 1 kHz) = | 4.3 |
| $\gamma_1$ (20° C.) = | t.b.d. mPa · s |
| $k_1$ (20° C.) = | 16.4 pN |
| $k_1/k_3$ (20° C.) = | 2.06 |
| $V_0$ (20° C., 1 kHz) = | 2.05 V |

Remarks: t.b.d.: to be determined.

TABLE 4

Properties of mixture M-2 at 30 GHz

| T/° C. | $\epsilon_{r,\parallel}$ | $\epsilon_{r,\perp}$ | tan $\delta_{\epsilon,r,\parallel}$ | tan $\delta_{\epsilon,r,\perp}$ |
|---|---|---|---|---|
| 20 | 3.1 | 2.4 | 0.0031 | 0.0140 |

This mixture is stable in the bulk for storage at a temperature of −20° C. for more than 120 h. It is highly suitable for applications in the microwave range, e.g. at a frequency of 30 GHz, due to its improved respective properties, in particular for phase shifters.

Example 3

A liquid crystal mixture M-3 having the composition and properties as indicated in the following table is prepared and investigated.

Composition Compound

| # | Abbreviation | |
|---|---|---|
| 1 | GGP-3-CL | 12.0 |
| 2 | GGP-5-CL | 20.0 |
| 3 | PPTUI-3-2 | 20.0 |
| 4 | PPTUI-3-4 | 20.0 |
| 5 | PPTUI-4-4 | 20.0 |
| 6 | PPP(2)P-4-4 | 8.0 |
| Σ | | 100.0 |

Physical properties

| | |
|---|---|
| T(N, I) = | 147.5° C. |
| $n_e$ (20° C., 589.3 nm) = | t.b.d. |
| Δn (20° C., 589.3 nm) = | t.b.d. |
| $\epsilon_{\parallel}$ (20° C., 1 kHz) = | 8.1 |
| Δε (20° C., 1 kHz) = | 4.7 |
| $\gamma_1$ (20° C.) = | 718 mPa · s |
| $k_1$ (20° C.) = | 17.4 pN |
| $K_1/k_3$ (20° C.) = | 1.54 |
| $V_0$ (20° C., 1 kHz) = | 2.05 V |

Remarks:
t.b.d.: to be determined.

TABLE 5

| \multicolumn{5}{c}{Properties of mixture M-3 at 30 GHz} |
| T/° C. | $\epsilon_{r,\parallel}$ | $\epsilon_{r,\perp}$ | tan $\delta_{\epsilon,r,\parallel}$ | tan $\delta_{\epsilon,r,\perp}$ |
| --- | --- | --- | --- | --- |
| 20 | 3.1 | 2.4 | 0.0034 | 0.0133 |

This mixture is very highly suitable for applications in the microwave range, in particular for phase shifters. It shows a favourably good stability against storage at low temperatures and a low values of the loss in the microwave range e.g. at frequencies of 30° GHz.

The invention claimed is:

1. A liquid crystal medium, comprising
10% to 85% by weight, based on the medium, of a first component, component A, consisting of one, two, three or more compounds of formula I

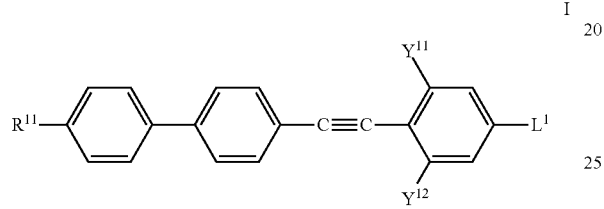

wherein
$L^1$ is $R^{12}$ or $X^1$,
$R^{11}$ is $C_nH_{2n+1}$, $O-C_nH_{2n+1}$ or $CH_2=CH-(CH_2)_z$,
$R^{12}$ is $C_mH_{2m+1}$ or $O-C_mH_{2m+1}$ or $(CH_2)_z-CH=CH_2$,
$X^1$ is F or Cl,
$Y^{11}$ and $Y^{12}$ are independently of one another H or F,
n and m independently of one another, denote an integer in the range from 1 to 9 and
z denotes 0, 1, 2, 3 or 4,
and
a second component, component B, consisting of one, two, three or more compounds of formulae III, IV, V or VI

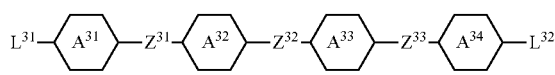

wherein
$L^{31}$ denotes $R^{31}$,
$L^{32}$ denotes $R^{32}$,
$R^{31}$ and $R^{32}$, independently of one another, denote H, non-fluorinated alkyl or alkoxy having 1 to 15 or non-fluorinated alkenyl, alkenyloxy or alkoxyalkyl having 2 to 15 C atoms,
$Z^{31}$ to $Z^{33}$, independently of one another, denote trans-CH=CH—, trans-CH=CF—, trans-CF=CH—, trans-CF=CF— or a single bond,

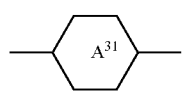

denotes

,

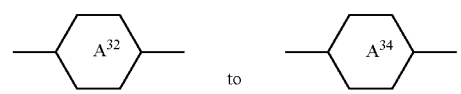

to denote independently of one another

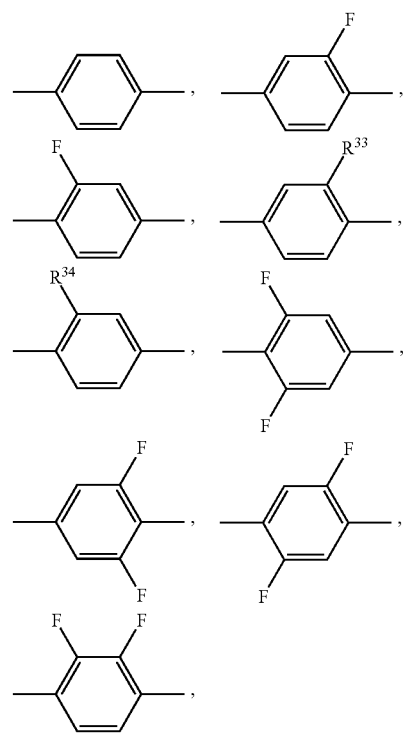

with one of

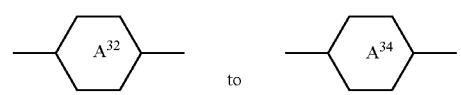

to being

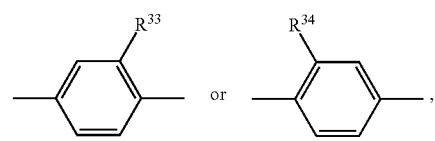

or

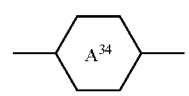

alternatively may denote

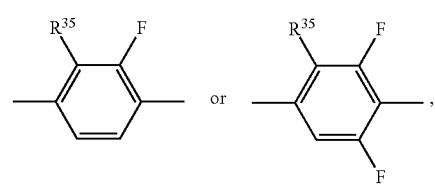

and $R^{33}$ to $R^{35}$, independently of one another, denote non-fluorinated alkyl or alkoxy having 1 to 15 or non-fluorinated alkenyl, alkenyloxy or alkoxyalkyl having 2 to 15 C atoms,

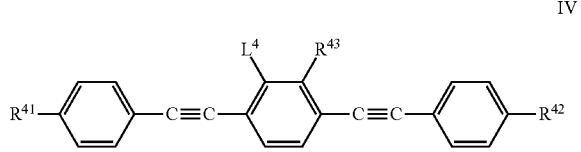

IV wherein $R^{41}$ to $R^{43}$, independently of one another, denote non-fluorinated alkyl or non-fluorinated alkoxy, each having 1 to 15 C atoms, non-fluorinated alkenyl, non-fluorinated alkenyloxy or non-fluorinated alkoxyalkyl, each having 2 to 15 C atoms, or cycloalkyl, alkylcycloalkyl, cycloalkenyl, alkylcycloalkenyl, alkylcycloalkylalkyl or alkylcycloalkenylalkyl, each having up to 15 C atoms and $L^4$ denotes F, or non-fluorinated alkyl or non-fluorinated alkoxy, each having 1 to 15 C atoms, non-fluorinated alkenyl, non-fluorinated alkenyloxy or non-fluorinated alkoxyalkyl, each having 2 to 15 C atoms,

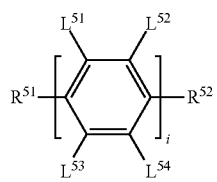

V wherein $R^{51}$ and $R^{52}$, independently of one another, denote halogen, non-fluorinated alkyl or fluorinated alkyl or non-fluorinated alkoxy or fluorinated alkoxy, each having 1 to 15 C atoms, or non-fluorinated alkenyl or fluorinated alkenyl, non-fluorinated alkenyloxy or non-fluorinated alkoxyalkyl or fluorinated alkoxyalkyl, each having 2 to 15 C atoms, in which, in addition, one or more "—$CH_2$—" groups may be replaced, independently of one another, by cycloalkyl having 3 to 6 C atoms, and alternatively, in addition, one of $R^{51}$ and $R^{52}$ or both $R^{51}$ and $R^{52}$ denote H, $L^{51}$ to $L^{54}$ on each appearance, in each case independently of one another, denote H, alkyl having 1 to 15 C atoms, F or Cl, and i denotes an integer in the range from 5 to 15, and

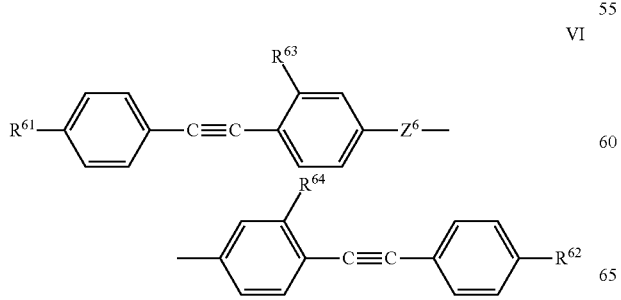

VI wherein $R^{61}$ and $R^{62}$, independently of one another, denote halogen, non-fluorinated alkyl or fluorinated alkyl or non-fluorinated alkoxy or fluorinated alkoxy, each having 1 to 15 C atoms, or non-fluorinated alkenyl or fluorinated alkenyl, non-fluorinated alkenyloxy or non-fluorinated alkoxyalkyl or fluorinated alkoxyalkyl, each having 2 to 15 C atoms, in which, in addition, one or more "—$CH_2$—" groups may be replaced, independently of one another, by cycloalkyl having 3 to 6 C atoms, $R^{63}$ and $R^{64}$, independently of one another, denote alkyl having 1 to 15 C atoms, and, alternatively, one of them also denotes H, $Z^6$ denotes —C≡C— or a single bond.

2. The liquid crystal medium according to claim 1, comprising the compounds of formula I in a total concentration in the range of 40% or more to 85% or less.

3. The liquid crystal medium according to claim 1, comprising one or more compounds of formula II

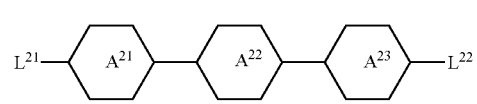

II wherein $L^{21}$ denotes $R^{21}$ or $X^{21}$, $L^{22}$ denotes $R^{22}$ or $X^{22}$, $R^{21}$ and $R^{22}$, independently of one another, denote H, non-fluorinated alkyl or non-fluorinated alkoxy having 1 to 17 C atoms or non-fluorinated alkenyl, non-fluorinated alkenyloxy or non-fluorinated alkoxyalkyl having 2 to 15 C atoms, $X^{21}$ and $X^{22}$, independently of one another, denote H, F, Cl, —CN, —NCS, —$SF_5$, fluorinated alkyl or fluorinated alkoxy having 1 to 7 C atoms or fluorinated alkenyl, non-fluorinated or fluorinated alkenyloxy or non-fluorinated or fluorinated alkoxyalkyl having 2 to 7 C atoms,

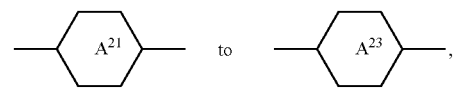

independently of one another, denote

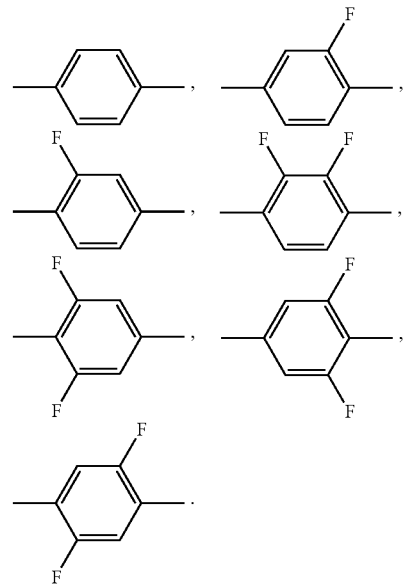

4. The liquid crystal medium according to claim 3, consisting of compounds of formula I and compounds of formulae II to VI.

5. The liquid crystal medium according to claim 3, additionally comprising one or more compounds of formulae II-1a-1 to II-1a-4

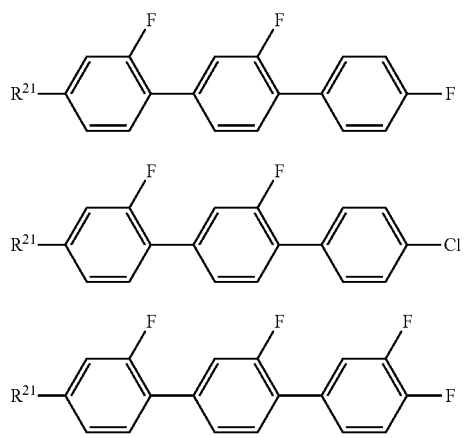

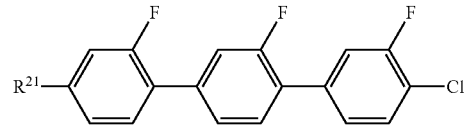

wherein
$R^{21}$ has the meaning given for $R^{11}$.

6. The liquid crystal medium according to claim 1, additionally comprising one or more compounds of formula III.

7. The liquid crystal medium according to claim 1, comprising one or more compounds of the formula IV.

8. The liquid crystal medium according to claim 1, comprising one or more compounds of formula V.

9. The liquid crystal medium according to claim 1, comprising one or more compounds of formula VI.

10. A component for high-frequency technology, comprising a liquid crystal medium according to claim 1.

11. The component according to claim 10, that is suitable for operation in the microwave range.

12. The component according to claim 10, that is a phase shifter.

13. A microwave device, comprising one or more components according to claim 10.

* * * * *